(12) United States Patent
Kawakami et al.

(10) Patent No.: US 7,001,581 B2
(45) Date of Patent: Feb. 21, 2006

(54) METHOD FOR PRODUCING NANOCARBON MATERIALS

(75) Inventors: Soichiro Kawakami, Nara (JP);
Tomoya Yamamoto, Fukui (JP);
Hitomi Sano, Kyoto (JP); Atsushi Tani, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 654 days.

(21) Appl. No.: 10/263,754

(22) Filed: Oct. 4, 2002

(65) Prior Publication Data

US 2003/0086859 A1    May 8, 2003

(30) Foreign Application Priority Data

Oct. 4, 2001   (JP)   .............................. 2001-309271
Oct. 2, 2002   (JP)   .............................. 2002-289557

(51) Int. Cl.
*D01F 9/12*     (2006.01)

(52) U.S. Cl. ............................. 423/447.3; 423/447.1; 423/445 B

(58) Field of Classification Search ............ 423/447.3, 423/447.1, 445 B
See application file for complete search history.

(56) References Cited

U.S. PATENT DOCUMENTS

| | | | |
|---|---|---|---|
| 6,455,021 B1 | 9/2002 | Saito | 423/447.3 |
| 2002/0102193 A1 | 8/2002 | Smalley et al. | 422/190 |
| 2002/0102194 A1 | 8/2002 | Smalley et al. | 422/190 |
| 2002/0102203 A1 | 8/2002 | Smalley et al. | 423/447.3 |
| 2003/0072706 A1 | 4/2003 | Kawakami et al. | 423/445 R |

FOREIGN PATENT DOCUMENTS

| | | |
|---|---|---|
| JP | 5-186865 | 7/1993 |
| JP | 6-32606 | 2/1994 |
| JP | 6-56414 | 3/1994 |
| JP | 6-157016 | 6/1994 |
| JP | 7-215710 | 8/1995 |
| JP | 9-188509 | 7/1997 |
| JP | 2000-86217 | 3/2000 |
| JP | 2000-95509 | 4/2000 |
| WO | WO 95/06001 | 3/1995 |
| WO | WO 02/060813 A2 | 8/2002 |

OTHER PUBLICATIONS

Yury G. Gogotsi et al., "Formation of Filamentous Carbon from Paraformaldehyde Under High Temperatures and Pressures," 36(7-8) *Carbon* 937-942 (1998).

Yury G. Gogotsi et al., "Hydrothermal Synthesis of Multiwall Carbon Nanotubes," 15(12) *J. Mater. Res.* 2591-2594 (Dec. 2000).

Jose Maria Calderon Moreno et al., "Hydrothermal Processing of High-Quality Multiwall Nanotubes from Amorphous Carbon," 123 *J. Am. Chem. Soc.* 741-742 (2001).

Pratibhash Chattopadhyay et al., "Supercritical $CO_2$-Based Production of Fullerene Nanoparticles," 39 *Ind. Eng. Chem. Res.* 2281-89 (2000).

U.S. Appl. No. 10/807,104, filed Mar. 24, 2004, Kawakami et al.

H.M. Cheng et al., "Large-Scale and Low-Cost Synthesis of Single-Walled Carbon Nanotubes by the Catalytic Pyrolysis of Hydrocarbons," 72(25) *Appl. Phys. Lett.* 3282-84 (Jun. 1998).

Bipin Kumar Gupta et al., "Synthesis and Hydrogeneration Behaviour of Graphitic Nanofibers," 25 *International Journal of Hydrogen Energy* 825-30 (2000).

*Primary Examiner*—Stuart Hendrickson
*Assistant Examiner*—Rebecca M. Stadler
(74) *Attorney, Agent, or Firm*—Fitzpatrick, Cella, Harper & Scinto

(57) ABSTRACT

A method for producing fullerenes, characterized in that said method includes a step (a) of contacting an aromatic compound-containing starting material with a supercritical fluid or a subcritical fluid in the presence of a transition metal element-containing catalyst at a temperature in a range of from 350 to 800° C. and at a pressure in a range of from 3 to 50 MPa. Said supercritical fluid or said subcritical fluid is formed from one or more kinds of materials selected from the group consisting of an aromatic compound as said starting material, a solvent for said aromatic compound, a solvent for said catalyst, water, dinitrogen monoxide, and ammonia.

25 Claims, 13 Drawing Sheets

F I G. 3
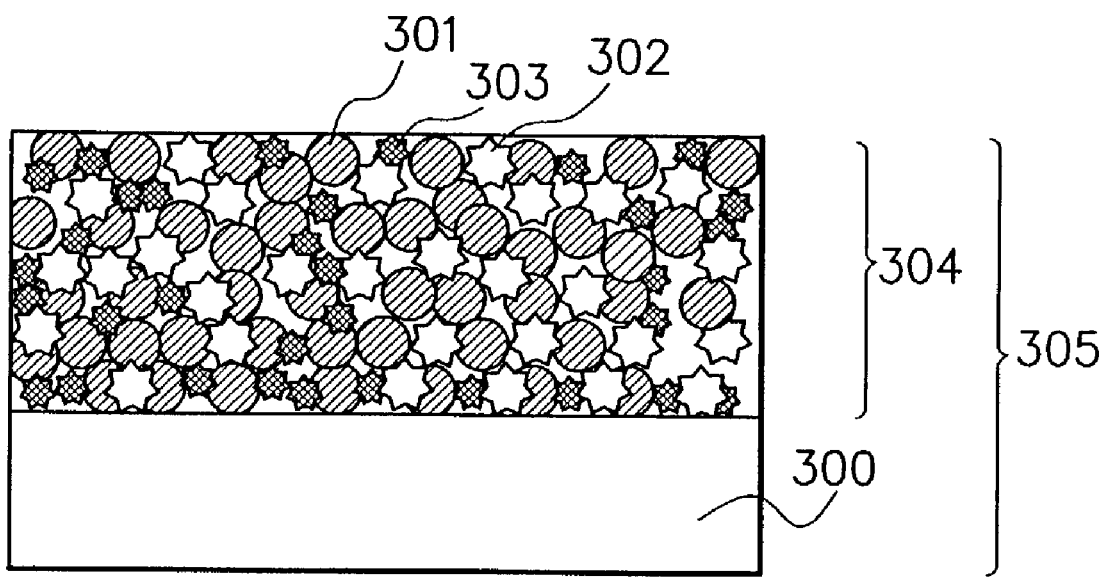

F I G. 4
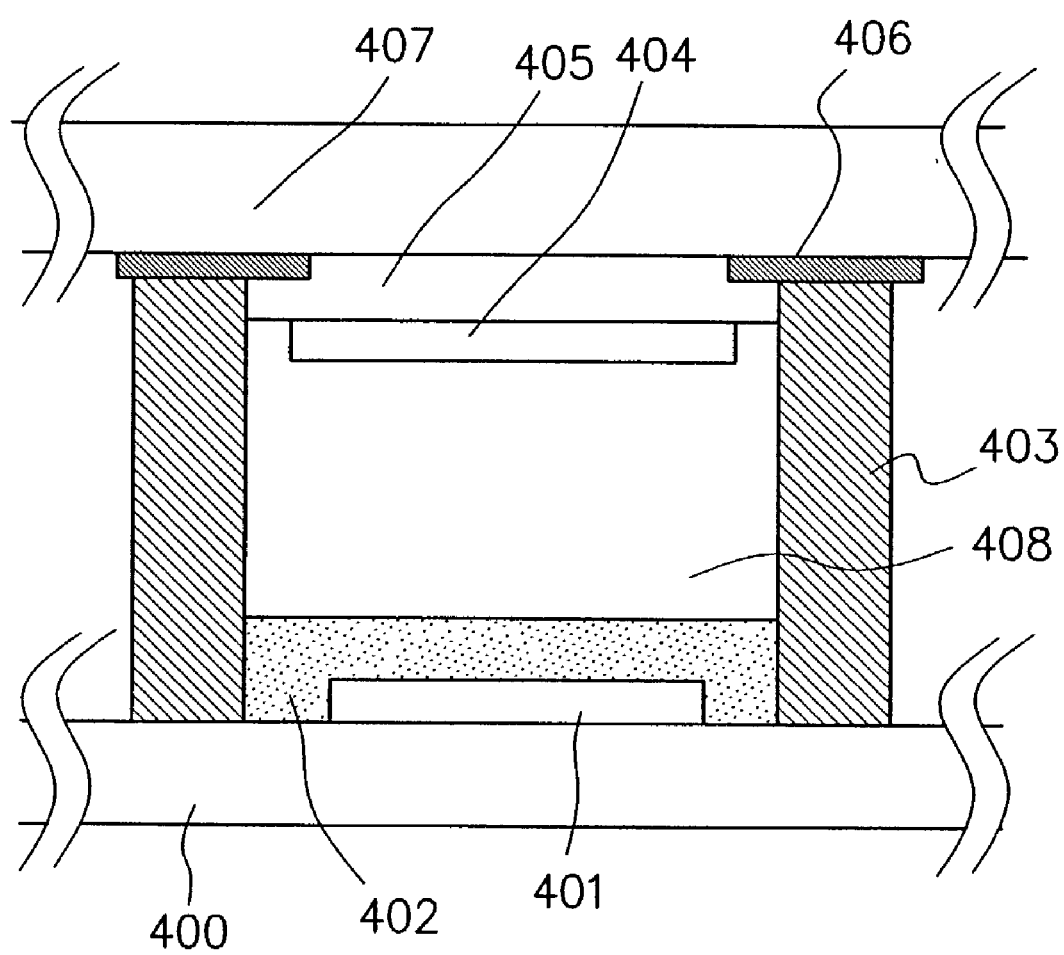

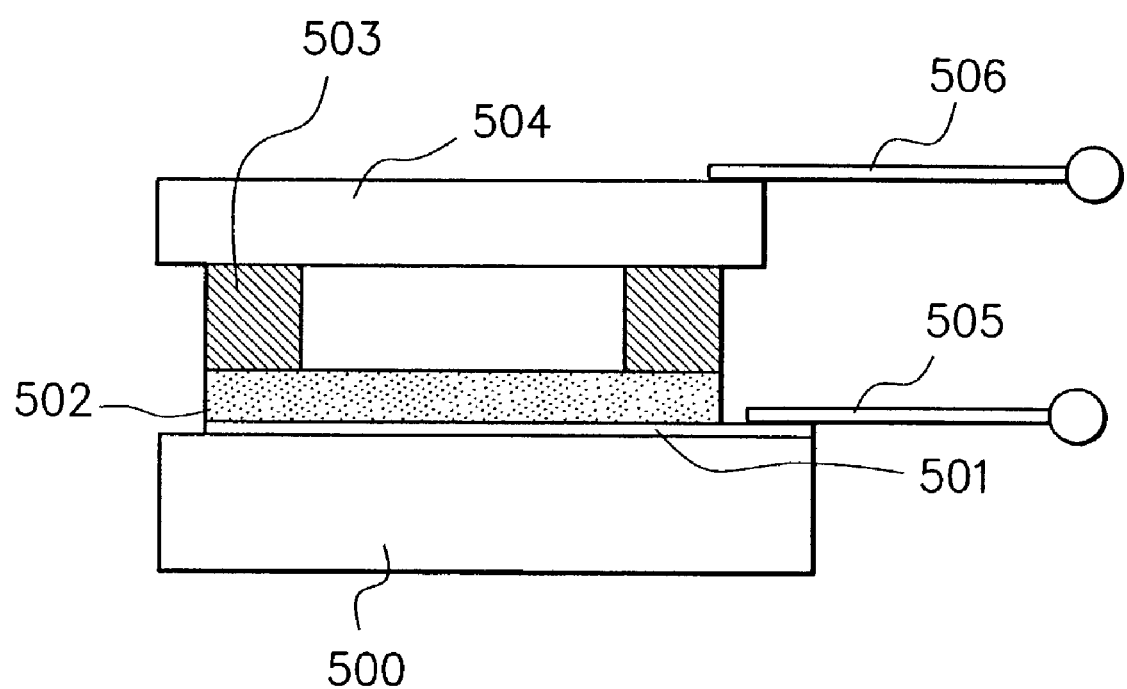
F I G. 5

F I G. 11(a)
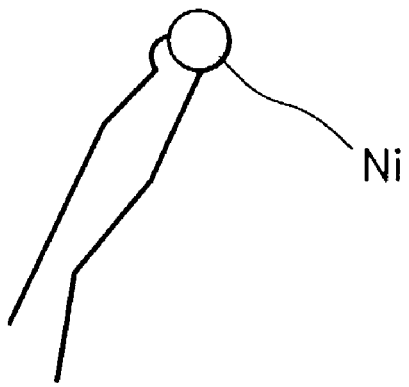
F I G. 11(b)
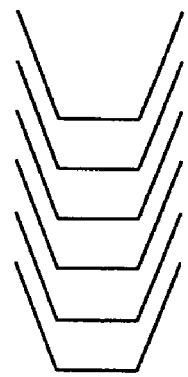
F I G. 11(c)
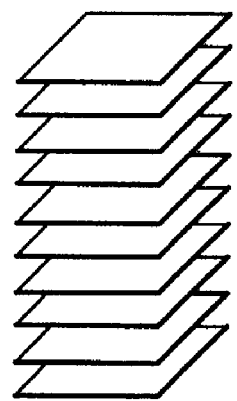

METHOD FOR PRODUCING NANOCARBON MATERIALS

BACKGROUND OF THE INVENTION

1. Field of the Invention

The present invention relates to a method for producing nanocarbon materials. More particularly, the present invention relates to a method which enables one to quantitatively produce nanocarbon materials from relatively inexpensive starting material by a simple manner using a relatively inexpensive reaction apparatus. The nanocarbon materials produced according to the present invention include carbon nanotubes, carbon nanofibers, and the like.

2. Related Background Art

Since the discovery of a fullerene $C_{60}$ having a soccer ball-like polyhedral molecular structure comprising 60 carbon atoms by H. W. Kroto, R. E. Smallry and R. F. Curl, other fullerenes have been discovered, and various studies on their industrial application have been carrying out. Separately, since the discovery of a carbon nanotube (CNT) corresponding to a cylindrical molecule of a fullerene, specifically having a molecular structure in which a graphene sheet (a single atomic layer of crystalline graphite) rolled up into a cylinder by Iijima in 1991, other carbon nanotubes have been discovered. And it has been reported that these carbon nanotubes have an excellent electron emission performance, a function to store hydrogen therein, and a function to take up and store lithium therein and release said lithium in the electrochemical reaction. In view of this, researches have been conducting to use such carbon nanotubes as electrode materials in light emission devices such as FEDs (field emission displays), as electrode materials in rechargeable lithium batteries, as catalyst-retaining carbon materials in fuel cells, and as hydrogen storage materials in hydrogen storage systems.

As the method for producing such carbon nanotubes, there are known a method wherein arc-discharge is generated in an gas atmosphere containing a carbon material such as hydrocarbon, a method wherein a target comprising graphite is evaporated by irradiating a laser thereto, and a method wherein a gaseous carbon material comprising acetylene or the like is subjected to thermal decomposition on a substrate having a catalyst of cobalt metal or nickel metal arranged thereon.

Particularly, Japanese Laid-open Patent Publication 6(1994)-157016 discloses a method for producing carbon nanotubes, wherein arc-discharge is generated between a pair of carbon rods respectively as a positive electrode and a negative electrode in an inert gas atmosphere to deposit a carbon nanotubes-containing solid material on the negative electrode.

Japanese Laid-open Patent Publication P2000-95509A discloses a method for producing carbon nanotubes, wherein a rod-shaped positive electrode containing carbon and non-magnetic transition metal and a rod-shaped negative electrode comprising graphite are arranged such that their tips are opposed to each other and arc-discharge is generated between the tip of the positive electrode and that of the negative electrode in an inert gas atmosphere to deposit carbon nanotubes on the tip portion of the negative electrode.

Japanese Laid-open Patent Publication 9(1997)-188509 discloses a method for producing carbon nanotubes, wherein a carbon material and a metal catalyst are supplied into a high frequency plasma generated to deposit carbon nanotubes on a substrate.

Japanese Laid-open Patent Publication 9(1997)-188509 discloses a method for producing carbon nanotubes, wherein a graphite-containing carbon rod is positioned in a quartz tube arranged in an electric furnace and a laser is irradiated to said carbon rod in an inert gas atmosphere to deposit carbon nonatubes on the inner wall face of the quartz tube.

Japanese Laid-open Patent Publication P2000-86217A discloses a method for producing carbon nanotubes, wherein gaseous hydrocarbon is thermally decomposed on a catalyst comprising a molybdenum metal or a molybdenum metal-containing material to deposit carbon nanotubes on said catalyst.

However, any of the above-mentioned methods for producing nanocarbon materials (carbon nanotubes) has disadvantages such that the starting material and the apparatus used for practicing the method are costly and therefore a product obtained becomes unavoidably costly and it is difficult to quantitatively produce nanocarbon materials.

Separately, *Carbon* Vol. 36, No. 7-8, pp. 937–942, 1998 (Yury G. Gogotsi et al.) describes a method in that filamentous carbons are formed from paraformaldehyde by way of hydrothermal reaction at a temperature of 700 to 750° C. under 100 Mpa pressure for 150 hours.

*Journal of Materials Research Society*, Vol. 15, No. 12, pp. 2591–2594, 2000 (Yury Gogosi et als.) describes that multiwall carbon nanotubes are formed from polyethylene by way of pyrolysis of said polyethylene in the presence of nickel at a temperature of 700 to 800° C. under 60 to 100 Mpa.

*Journal of American Chemical Society* Vol. 123, No. 4, pp. 741–742, 2001 (Jose Maria Calderon et al.) describes a method wherein multiwall carbon nanotubes are formed from amorphous carbon by way of hydrothermal treatment of said amorphous carbon in the absence of a metal catalyst at a temperature of 800° C. under 100 Mpa pressure for 48 hours.

However, in any of the methods described in the above-described documents, because high pressure condition of 100 Mpa or 60 to 100 Mpa is adopted, a specific high pressure capsule made of Au (which is costly) and which can withstand such high pressure is used as the reaction vessel, and the starting material and water are introduced into said capsule wherein the starting material is subjected to hydrothermal reaction at a high temperature (700 to 800° C.) under high pressure condition of 100 Mpa or 60 to 100 Mpa. Therefore, a product obtained in any of the methods described in the above-described documents unavoidably becomes costly.

And any of the above-described documents does not teach or suggest a method which enables one to efficiently produce nanocarbon materials (including carbon nanotubes or filamentous carbons) under low pressure condition of less than 50 Mpa, using a relatively inexpensive pressure reaction vessel without necessity of using such costly pressure reaction vessel.

There is a demand for providing a method which enables one to quantitatively produce nanocarbon materials (including carbon nanotubes and carbon nanofibers), which are usable as electrode materials in devices such as FEDs (field emission displays), as electrode materials in rechargeable lithium batteries, as catalyst-retaining carbon materials in fuel cells, and as hydrogen storage materials in hydrogen storage systems, at a reasonable production cost from relatively inexpensive raw material by a simple manner under low pressure condition which does not require to use such specific and costly pressure reaction vessel as above described.

SUMMARY OF THE INVENTION

The present invention has been accomplished in view of the circumstances in the prior art for the production of nanocarbon materials and in view of satisfying the above-described demand.

The present invention makes it an object to provide a method which enables one to quantitatively produce nanocarbon materials at a reasonable production cost from relatively inexpensive raw material under low pressure condition.

The term "nanocarbon material" in the present invention means a nonocarbon material containing no fullerene and in which an enormous number of certain structures comprising carbon and having a primary size in a range of from 2 nm to 400 nm are identified in the observation not only by an electron microscope but also a scanning electron microscope (SEM) and in which a number of lattice images of crystalline carbon are identified in the observation by a transmission electron microscope (TEM). The "nanocarbon material" in the present invention includes so-called carbon nanotube and so-called carbon nanofiber.

The nanocarbon materials produced in the present invention include carbon nanotubes and carbon nanofibers, which are usable as electrode materials in light emission devices such as FEDs (field emission displays), as electrode materials in rechargeable lithium batteries, as catalyst-retaining carbon materials in fuel cells, and as hydrogen storage materials in hydrogen storage system.

The nanocarbon materials produced in the present invention include nanocarbon materials comprising such aggregates as below-mentioned which are identified in the observation by the electron microscope. Particularly, the nanocarbon materials produced in the present invention include nanocarbon materials comprising aggregates of a plurality of worm-like shaped microunits; nanocarbon materials comprising aggregates of a plurality of filament-like shaped microunits; nanocarbon materials comprising aggregates of a plurality of coral-like shaped microunits; nanocarbon materials comprising aggregates of a plurality of rod-like shaped microunits each comprising spherical microparticles aggregated into an unit; and nanocarbon materials comprising aggregates of a plurality of tube-like shaped microunits, wherein the microunits in each case have an average diameter in a range of from 2 to 400 nm and an average length in a range of from 100 to 10000 nm, and the microunits in each case may have a transition metal element, a transition metal, a transition metal carbide, a transition metal oxide or a transition metal sulfide at their tip portion. These nanocarbon materials produced in the present invention include nanocarbon materials having such a structure at molecular level as mentioned in the following which is identified in the observation by the TEM; a structure in that a plurality of graphene sheets (each comprising a single atomic layer of crystalline graphite) are stacked and developed into a fiber state, a structure in that a plurality of graphene sheets shaped in a cup-like form are stacked and developed into a filament-like state, or a structure in that a plurality of graphene sheets are connected with each other through their opposite ends into a tubular form.

The method for producing nanocarbon materials of the present invention is characterized in that said method includes a step of contacting an aromatic compound-containing starting material with a supercritical fluid or a subcritical fluid in the presence of a transition metal element-containing catalyst at a temperature in a range of from 350 to 800° C. and at a pressure in a range of from 3 to 50 MPa.

The supercritical fluid means a fluid having liquid properties and gaseous properties and which is in a state with a temperature and a pressure respectively exceeding the critical point (the critical temperature and the critical pressure) where gas and liquid can together exist. The subcritical fluid means a fluid following the supercritical fluid. Specifically, when the above critical temperature is made to be $T_0$ (absolute temperature) and the above critical pressure is made to be $P_0$ (MPa), the subcritical fluid means a fluid which is in a state with an absolute temperature T and a pressure P which satisfy the following equations.

$T \geq 0.8T_0$ $P \geq 0.8P_0$

The supercritical fluid or the subcritical fluid is formed from one or more raw materials selected from the group consisting of aromatic compounds as the starting material, a solvent for said aromatic compounds or the catalyst, water, dinitrogen monoxide, and ammonia. Said solvent for said aromatic compounds or the catalyst is preferred to comprise a solvent which can dissolve more than 2 mole % of a solute (that is, said aromatic compound or the catalyst) at a temperature of 20° C. under pressure of 0.1013 MPa, such as carbon dioxide, water, and alcohols. These solvents may be used either singly or in combination of two or more of them.

It is preferred that inert gas is introduced into the system where the starting material is contacted with the supercritical fluid or the subcritical fluid in the presence of the transition metal element-containing catalyst.

The inert gas in this case can include argon gas, helium gas, and nitrogen gas. These gases may be used either singly or in combination of two or more of them as a mixed gas.

The aromatic compound-containing starting material used in the present invention can include benzene, ethylbenzene, butylbenzene, toluene, xylene, styrene, biphenyl, phenylacetylene, phenol, ethylphenol, fluoranthene, pyrene, chrysene, phenanthrene, anthracene, naphthalene, methylnaphthalene, fluorene, biphenyl, acenaphthene, pitch, pitch coke, petroleum coke, and coal tar. These materials may be used either singly or in combination of two or more of them.

In the method of the present invention, in the case where the aromatic compound-containing starting material comprises an aromatic compound-containing starting material selected from the above-mentioned materials and which can be converted into a supercritical fluid or a subcritical fluid at a temperature in the foregoing temperature range of from 350 to 800° C. and at a pressure in the foregoing pressure range of from 3 to 50 MPa, it is not always necessary to use the raw material for forming the supercritical fluid or the subcritical fluid.

The transition metal element of the transition metal element-containing catalyst is preferred to be a transition element selected from the group consisting of Ni, Co, Fe, Cu, Cr, W, Mo, Ti, Ru, Rh, Pd, and Ag.

The transition metal element-containing catalyst may comprise at least one transition metal selected from the group consisting of transition metals of these transition metal elements or at least one transition metal compound selected from the group consisting of transition metal compounds of these transition metal elements.

The transition metal compound can include transition metal sulfides, transition metal carbides, organo transition metal compounds, transition metal nitrides, transition metal oxides, and salts of transition metals. These transition metal compounds may be used either singly or in combination of two or more of them.

At the time when the starting material is contacted with the supercritical fluid or the subcritical fluid in the presence of the transition metal element-containing catalyst, it is possible that a surface-active agent is made to coexist together with the transition metal element-containing catalyst. In this case, particles of the catalyst are prevented from being aggregated and as a result, the amount of nonocarbon materials synthesized per a unit weight of the catalyst is increased.

In the present invention, when the starting material is contacted with the supercritical fluid or the subcritical fluid in the presence of the transition metal element-containing catalyst, there is afforded a reaction product containing nanocarbon materials. The method of the present invention further include a step of subjecting the reaction product to a heat treatment at a temperature in a range of from 400 to 2800° C., in order to remove impurities contained in the reaction product. In a preferred embodiment of this heat-treating step, the reaction product is subjected to a first heat treatment at a temperature in a range of from 400 to 900° C., then, the reaction product is subjected to a second heat treatment at a temperature in a range of from 900 to 2800° C.

The heat treatment in the heat treating step is preferred to be performed in a gas atmosphere composed of one or more gases selected from the group consisting of argon gas, helium gas and nitrogen gas.

The method of the present invention is preferred to include a purification step in that the heated-treated product is purified. Specifically, in the case where the nanocarbon materials contained in the heat-treated reaction product contain a magnetic metal element therein resulted from the catalyst, the magnetic metal element-containing nanocarbon materials are collected by means of a magnet, whereby it is possible to obtain a purified nanocarbon materials-containing product. Separately, in the case where the nanocarbon materials contain a transition metal or a transition metal compound resulted from the catalyst and it is not necessary for the nanocarbon materials to contain such transition metal or such transition metal compound, it is possible to remove such transition metal or such transition metal compound therefrom by way of washing with an acid or the like.

BRIEF DESCRIPTION OF THE DRAWINGS

FIG. 3 is a schematic cross-sectional view illustrating an example of an electrode structural body for a rechargeable lithium battery, wherein said electrode structural body is formed using a nanocarbon materials-containing product obtained according to the method of the present invention.

FIG. 4 is a schematic cross-sectional view illustrating an example of a FED in which a nanocarbon materials-containing product obtained according to the method of the present invention is applied.

FIG. 5 is a schematic cross-sectional view illustrating an example of an element for examining the electron emission performance of a nanocarbon materials-containing product.

FIG. 11(a) is a schematically enlarged view illustrating an example of the microstructural form of a nanocarbon material produced by the method of the present invention, observed from the SEM image thereof; FIG. 11(b) is a schematically enlarged view illustrating an example of the microstructural form of a nanocarbon material produced by the method of the present invention, observed from the TEM image thereof; and FIG. 11(c) is a schematically enlarged view illustrating another example of the microstructural form of a nanocarbon material produced by the method of the present invention, observed from the TEM image thereof.

DETAILED DESCRIPTION OF THE INVENTION AND PREFERRED EMBODIMENTS

Figure 1:
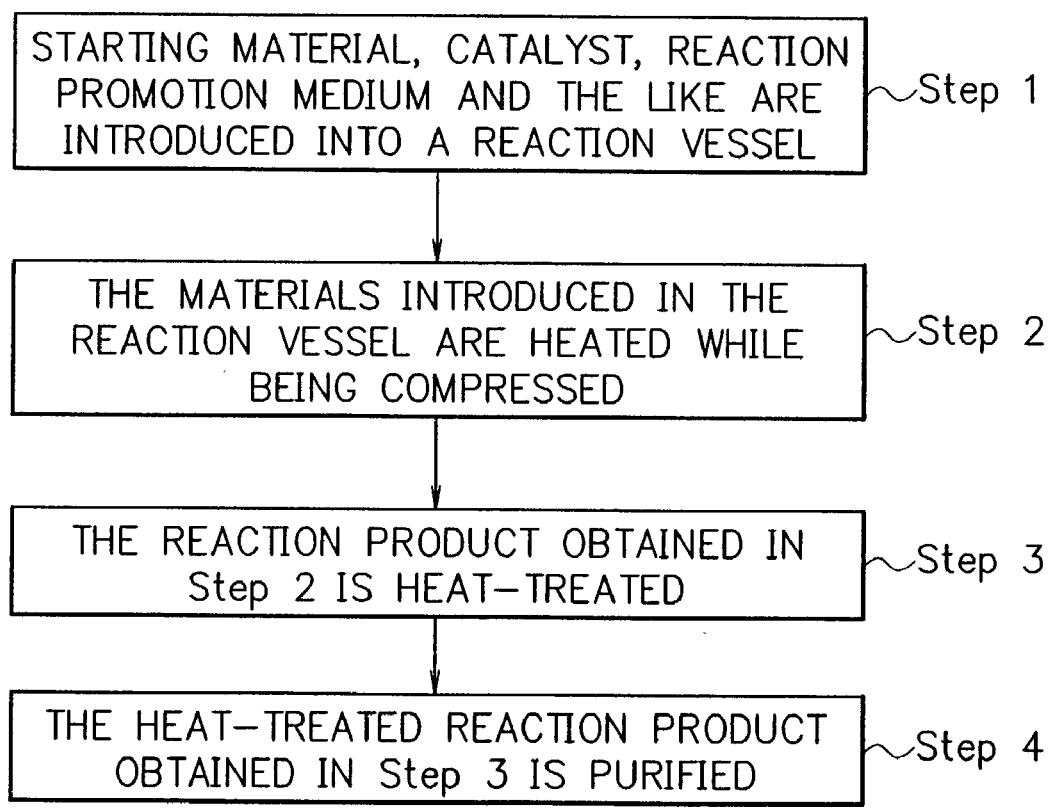
FIG. 1 shows a flow chart illustrating an example of the method for producing nanocarbon materials according to the present invention.

As previously described, the present invention provides a method which enables one to quantitatively produce nanocarbon materials, characterized in that said method includes a step (a) of contacting an aromatic compound-containing starting material with a supercritical fluid or a subcritical fluid in the presence of a transition metal element-containing catalyst at a temperature in a range of from 350 to 800° C. and at a pressure in a range of from 3 MPa to 50 MPa.

As the aromatic compound-containing starting material used in the present invention, any aromatic compound-containing materials capable of producing nanocarbon materials and which can be acquired at a reasonable cost can be selectively used.

As specific examples of such aromatic compound-containing material, there can be illustrated benzene, ethylbenzene, butylbenzene, toluene, xylene, styrene, biphenyl, phenylacetylene, phenol, ethylphenol, fluoranthene, pyrene, chrysene, phenanthrene, anthracene, naphthalene, methylnaphthalene, fluorene, acenaphthene, pitch, pitch coke, petroleum coke, and coal tar. These aromatic compound-containing materials may be used either singly or in combination of two or more of them.

Of the above-mentioned materials, benzene, toluene, naphthalene, methylnaphthalene, pitch, pitch coke, petroleum coke, and coal tar are preferred because they can be easily acquired at a relatively inexpensive cost.

As previously described, the supercritical fluid used in the present invention means a fluid having liquid properties and gaseous properties and which is in a state with a temperature and a pressure respectively exceeding the critical point (the critical temperature and the critical pressure) where gas and liquid can together exist. And the subcritical fluid used in the present invention means a fluid following the supercritical fluid. Specifically, when the above critical temperature is made to be $T_0$ (absolute temperature) and the above critical pressure is made to be $P_0$ (MPa), the subcritical fluid means a fluid which is in a state with an absolute temperature T and a pressure P which satisfy the following equations.

$T \geq 0.8T_0$ $P \geq 0.8P_0$

To contact the aromatic compound-containing starting material with the supercritical fluid or the subcritical fluid in the presence of the transition metal element-containing catalyst in the present invention may be performed, for instance, in the following manner. The aromatic compound-containing starting material, a raw material for forming the supercritical fluid or the subcritical fluid and a given transition metal element-containing catalyst are introduced into a substantially enclosed reaction vessel, and the starting material, the raw material and the transition metal element-containing catalyst introduced in the reaction vessel are together heated at a prescribed temperature while being compressed at a prescribed pressure, where the raw material in a mixed state with the starting material and the catalyst is converted into a supercritical fluid or a subcritical fluid and the starting material is contacted with the resulting supercritical fluid or the resulting subcritical fluid and also with the catalyst to cause reaction of the stating material, whereby nanocarbon materials are synthesized.

The heating temperature and the compressing pressure in this case are somewhat different depending upon the kind of the raw material used for forming the supercritical fluid or the subcritical fluid. However, in general, it is preferred that the heating temperature is in a range of from 350° C. to 800° C. and the compressing pressure is in a range of from 3 MPa to 50 MPa and it is more preferred that the heating temperature is in a range of from 400° C. to 600° C. and the compressing pressure is in a range of from 4 MPa to 30 MPa, from the viewpoint of the condition under which nanocarbon materials are produced and also from the viewpoints of diminishing the cost of the apparatus used and saving the operation energy.

The raw material for forming the supercritical fluid or the subcritical fluid is required to comprise a fluid material which can serve as a solvent for the starting material or as a solvent for the catalyst.

It is presumed that the supercritical fluid or the subcritical fluid formed from the raw material for forming the supercritical fluid or the subcritical fluid functions as a medium (a reaction promotion medium) to promote the formation of nonacarbon materials from the aromatic compound-containing starting material.

Therefore, it is preferred that the foregoing heating temperature and the foregoing compressing pressure respectively exceed the critical temperature and the critical pressure of the supercritical fluid or the subcritcal fluid.

In the case where the aromatic compound-containing starting material itself is situated in the supercritical fluid or the subcritical fluid, the starting material is in a very active state such that the reaction of the starting material will readily occur.

In the method of the present invention, it is most preferred that not only the starting material but also other materials which are used for synthesizing nanocarbon materials are respectively in a supercritical fluid state.

The raw material which is converted into the supercritical fluid or the subcritical fluid comprises a raw material capable of being converted into a supercritical fluid or a subcritical fluid at a temperature in a range of from 350° C. to 800° C. and at a pressure in a range of from 3 MPa to 50 MPa. Such raw material can include a solvent for aromatic compounds as the starting material, a solvent for the catalyst, dinitrogen monoxide, and ammonia. Said solvent is preferred to comprise a solvent which can dissolve more than 2 mole % of a solute (that is, said aromatic compound or the catalyst) at a temperature of 20° C. under pressure of 0.1013 MPa.

These materials may be used either singly or in combination of two or more of them as a mixture.

In the method of the present invention, in the case where the starting material comprises an aromatic compound-containing material selected from the previously illustrated materials as the starting material and which can converted into a supercritical fluid or a subcritical fluid at a temperature which falls in the above temperature range of from 350° C. to 800° C. and at a pressure which falls in the above pressure range of from 3 MPa to 50 MPa, it is not always necessary to introduce the raw material for forming the supercritical fluid or the subcritical fluid into the reaction vessel. Particularly, to use a given aromatic compound which can converted into a supercritical fluid or a subcritical fluid at a temperature in a range of from 350° C. to 800° C. and at a pressure in a range of from 3 MPa to 50 MPa as the starting material is more preferred for the reason that said aromatic compound as the starting material becomes to be very active so that the reaction thereof more readily proceeds under condition with said temperature and said pressure.

The transition metal element-containing catalyst used in the method of the present invention comprises particles of a given transition metal element-containing material. Therefore, the sizes of nanocarbon materials synthesized are quite liable to greatly depend on the particle sizes of the catalyst particles. In order to obtain nanocarbon materials which are substantially uniform with respect to their sizes, it is necessary that fine particles of the transition metal element-containing material are used as the transition metal element-containing catalyst and the catalyst fine particles are sufficiently contacted with the starting material such that each of the catalyst fine particles is contacted with the starting material. In this respect, it is preferred that the solvent capable of dissolving the aromatic compound-containing starting material or/and the catalyst (the catalyst fine particles) is mixed with the starting material and the catalyst. Separately, in order to desirably disperse the catalyst fine particles so that they are not aggregated, it is preferred to add a surface-active agent to the solvent.

As specific examples of the solvent for aromatic compound as the starting material or the catalyst, there can be illustrated carbon dioxide, water, alcohols, and ethers. These solvents may be used either singly or in combination of two or more of them as a mixed solvent. As specific examples of said alcohol, there can be illustrated methanol, ethanol, and propyl alcohol.

Of the above-mentioned solvents, carbon dioxide, water, methanol, and ethanol are preferable because they can be easily acquired at a reasonable cost and they can be readily handled. Particularly, carbon dioxide is the most appropriate for the reasons that besides functioning as the solvent, carbon dioxide itself is poor in terms of the reactivity and because of this, it is presumed that carbon dioxide will function to reduce the probability for the molecules of the starting material to be mutually collided and prevent side reactions from being occurred.

Here, the critical temperature and the critical pressure at which carbon dioxide is converted into a supercritical fluid are respectively 31° C. and 7.38 MPa. The critical temperature and the critical pressure at which water is converted into a supercritical fluid are respectively 374° C. and 22.0 MPa. Separately, the critical temperature and the critical pressure at which toluene is converted into a supercritical fluid are respectively 318° C. and 4.11 MPa. And the critical temperature and the critical pressure at which naphthalene is converted into a supercritical fluid are respectively 475° C. and 4.11 MPa.

In the method of the present invention, it is preferred to introduce inert gas into the system where the aromatic compound-containing starting material is contacted with the supercritical fluid or the subcritcal fluid in the presence of the transition metal element-containing catalyst, in order to synthesize nanocarbon materials at a high purity while reducing the probability for the molecules of the starting material to be mutually collided and preventing side reactions from being occurred. As the inert gas used, argon gas, helium gas, or nitrogen gas may be used.

The transition metal element of the transition element-containing catalyst used in the method of the present invention can include Ti, V, Cr, Mn, Fe, Co, Ni, Cu, Y, Zr, Nb, Mo, Ru, Rh, Pd, Ag, Ta, W, Pt, and Au. Of these, Ni, Co, Fe, Cu, Cr, W, Mo, Ti, V, Mn, Ru, Rh, Pd, and Ag are more preferred, and Ni, Co, Fe, Cu, Cr, W, Mo, and Ti are most preferred.

The transition metal element-containing catalyst may comprise at least one transition metal selected from the group consisting of transition metals of these transition metal elements or at least one transition metal compound selected from the group consisting of transition metal compounds of these transition metal elements.

In the method of the present invention, aforesaid transition metal or aforesaid transition metal compound as the transition metal element-containing catalyst is introduced into the reaction vessel together with the aromatic compound-containing starting material and the raw material for forming the supercritical fluid or the subcritical fluid. And in the reaction vessel, when the raw material is converted into the supercritical fluid or the subcritical fluid while being contacted with the starting material, the transition metal or the transition metal compound is present in contact with the starting material and the supercritical fluid or the subcritical fluid, where the transition metal or the transition metal compound functions as a starting point to initiate formation of nanocarbon materials from the stating material in contact with the supercritical fluid or the subcritical fluid and the nanocarbon materials thus started forming are gradually grown. In this case, it is considered that the transition metal or the transition metal compound behaves like a catalyst.

The transition metal or the transition metal compound is not always necessary to be externally added. The transition metal or the transition metal compound may be one originally contained in the starting material or one resulted when the starting material is contacted with the supercritical fluid or the subcritical fluid.

As preferable specific examples of the transition metal compound, there can be illustrated transition metal sulfides, transition metal carbides, organo transition metal compounds, transition metal nitrides, transition metal oxides, and salts of transition metal (hereinafter referred to as transition metal salts).

Of these, transition metal salts are more preferable for the following reason. For instance, when a given transition metal salt is used, the transition metal salt is reduced or oxidized into a transition metal or a transition metal oxide in the reaction to afford nanocabon materials in the method of the present invention. It is possible that said transition metal or said transition metal oxide is dissolved in an acid to recover as a transition metal salt. The recovered transition metal salt can be reused as the catalyst.

As preferable specific examples of aforesaid transition metal sulfide, there can illustrated nickel sulfide, iron sulfide, cobalt sulfide, copper sulfide, titanium sulfide, tungsten sulfide, and molybdenum sulfide.

As preferable specific examples of aforesaid transition metal carbide, there can be illustrated tungsten carbide, molybdenum carbide, and titanium carbide.

As preferable specific examples of aforesaid organo transition metal compound, there can be illustrated ferrocene, nickelocene, nickel formate, nickel oxalate, nickel naphthenate, nickel phthalocyanine, cobalt phthalocyanine, copper phthalocyanine, nickel acetylacetonato, cobalt acetylacetonato, iron acetylacetonato, copper acetylacetonato, nickel carbonyl, cobalt carbonyl, iron carbonyl, bis(triphenylphosphine)dicarbonylnickel, dibromobis(triphenylphosphine)nickel, and chlorotris(triphenylphosphine)rhodium.

For the transition metal or transition metal compound which is used as the transition metal element-containing catalyst in the method of the present invention, particles (fine particles) thereof are used as previously described. In the case where the average diameter of microunits (observed in the observation by the electron microscope) which constitute nanocarbon materials produced according to the method of the present invention depends on the average particle size of the catalyst particles, it is important to properly control the average particle size of the catalyst particles.

In order to obtain nanocarbon materials whose diameters are small and which are substantially uniform with respect to their sizes, it is preferred to adopt a manner in that the catalyst particles are used by dispersing them in a retaining body so as to retain them on the retaining body or a manner in that in addition to the catalyst particles, a solvent capable of dissolving them is introduced or a surface-active agent capable of preventing them from being aggregated is introduced.

In the present invention, in order to more promote the synthesis of nanocarbon materials, it is possible that sulfur or/and a sulfur compound are made to exist together with the transition metal or the transition metal compound as the transition metal element-containing catalyst in the system where the aromatic compound-containing material is contacted with the supercritical fluid or the subcritical fluid. In this case, the presence of said sulfur or/and said sulfur compound occasionally serves to control the direction for the nanocarbon materials to be grown.

The sulfur compound can include thiol, thioacetamide, thionaphthene, thiosemicarbazido, thiourea, and thiophene. Of these, thiol is particularly preferable.

As preferable specific examples of the thiol, there can be illustrated 1-octanethiol(n-octylmercaptan), 1-decanethiol (n-decylmercaptan), 1-dodecanethiol (n-dodecylmercaptan), n-butylmercaptan, propylmercaptan, methylmercaptan, ethylmercaptan, benzylmercaptan, and thiophenol.

The sulfur or the sulfur compound is not always necessary to be externally added. The sulfur or the sulfur compound may be one originally contained in the starting material. Particularly, pitch, pitch coke, petroleum coke and coal tar which are mentioned in the above as examples of the aromatic compound-containing starting material often contain sulfur or/and sulfur compound therein. Such sulfur or/and such sulfur compound contained in the starting material may be used instead of the sulfur or/and the sulfur compound which are externally added.

The method of the present invention is preferred to include a heat-treating step (b). In the heat-treating step (b), the reaction product obtained in the step (a) wherein the aromatic compound-containing starting material is contacted with the supercritical fluid or the subcritical fluid in the presence of the transition metal element-containing catalyst at a temperature in a range of from 350 to 600° C. is subjected to a heat treatment to remove impurities including unreacted material contained in the reaction product. The reaction product obtained in the step (a) contains nanocarbon materials synthesized in the step (a). The heat-treating step (b) serves to improve the purity of the nanocarbon materials contained in the reaction product by removing the impurities therefrom and it also serves to further develop the graphene sheet structures of the nanocarbon materials.

It is preferred that the reaction product prior to subjecting to the heat treatment or the heat-treated reaction product obtained in the heat-treating step is washed with an acid or the like to remove the catalyst (the catalyst particles) therefrom.

From a viewpoint of efficiently removing aforesaid impurities and also from a viewpoint of improving the purity of the nanocarbon materials, the heat treatment of the reaction product in the heat-treating step (b) is preferred to perform at a temperature in a range of from 400 to 2800° C. Similarly, the heat treatment of the reaction product in the heat-treating step (b) is preferred to perform in a gas atmosphere composed of inert gas. The inert gas can include argon gas, helium gas and nitrogen gas. These gases may be used either singly or in combination of two or more of them as a mixed gas.

In order to surely remove the impurities and in order to surely improve the purity of the nanocarbon materials, it is preferred that the heat treatment of the reaction product is repeated several times by changing the heat-treating temperature, for instance, in such a manner that the reaction product is subjected to a first heat treatment at a temperature in a low temperature side region of the above-described temperature region, followed by subjecting to a second heat treatment at a temperature in a middle to high temperature side region of the above-described temperature region. To be more specific, in order to desirably develop the graphene sheet structures of the nanocarbon materials while surely removing the impurities to improve the purity of the nanocarbon materials, it is preferred that the reaction product is subjected to a first heat treatment at a relatively low temperature in a range of from 400 to 800° C., followed by subjecting to a second heat treatment at a high temperature in a range of from 900 to 2800° C. and it is more preferred that the reaction product is subjected to a first heat treatment at a relatively low temperature in a range of from 400 to 800° C., followed by subjecting to a second heat treatment at a high temperature in a range of from 1000 to 2400° C.

Separately, the heat treatment of the reaction product at a temperature in a region of from 2400 to 2800° C. is liable to develop the graphite structures (comprising a plurality of graphene sheets stacked) of the nanocarbon materials contained therein.

In the case where the heat treatment of the reaction product is repeated several times in this way, in order to improve the effect of the heat treatment for the reaction product, it is possible to adopt a manner in that the heat-treated reaction product obtained, for instance, in the first heat treatment is pulverized prior to subjecting to the next heat treatment.

The nanocarbon materials synthesized according to the method of the present invention are different with respect to their constituent microunits observed by SEM (scanning electron microscope) depending on the kind of the aromatic compound-containing starting material, the kind of the transition metal element-containing catalyst, the kind of the raw material for forming the supercritical fluid or the subcritical fluid, the reaction temperature and the reaction pressure.

According to the method of the present invention, it is possible to synthesize nanocarbon materials comprising aggregates of a plurality of worm-like shaped microunits; nanocarbon materials comprising aggregates of a plurality of filament-like shaped microunits; nanocarbon materials comprising aggregates of a plurality of coral-like shaped microunits; nanocarbon materials comprising aggregates of a plurality of rod-like shaped micro units each comprising spherical microparticles aggregated into an unit; and nanocarbon materials comprising aggregates of a plurality of tube-like shaped microunits, wherein the microunits in each case have an average diameter in a range of from 2 to 400 nm and an average length in a range of from 100 to 10000 nm.

Particularly, according to the method of the present, nanocarbon materials comprising aggregates of a plurality of worm-like shaped microunits having an average diameter of 10 nm to 50 nm can be readily synthesized at a more high purity.

To be more specific, from the observation by a transmission electron microscope (TEM) with respect to the constituent microunits, those nanocarbon materials mentioned in the above include (a) nanocarbon materials having a microstruture in which a layered structure comprising a plurality of graphene sheets stacked is developed into a cylindrical structure having a diameter of 20 nm to 400 nm; (b) nanocarbon materials having a microstructure in which a plurality of cup-like shaped graphene sheets are gathered and developed into a stacked structure having a diameter of 10 nm to 50 nm; (c) nanocarbon materials having a microstructure in which the graphene sheet is rolled up into a single-layered cylindrical structure or a multi-layered cylindrical structure, respectively having a diameter of 0.4 nm to 10 nm; and (d) nanocarbon materials having a microstructure in which a graphene sheet is developed into a layered state whose end portion is closed, said closed end portion having a length of 0.4 nm to 5 nm. Separately, for the foregoing nanocarbon materials whose worm-like shaped microunits having an average diameter of 10 nm to 50 nm and can be readily synthesized according to the method of the present invention, nanocarbon materials having such microstructure as described in the above (a) or (b) can be readily synthesized at a high purity and at a high yield.

It is considered that in many cases, the growth of those nanocarbon materials mentioned in the above is initiated from the starting point based on the transition metal element-containing catalyst. Therefore, the synthesized nanocarbon materials contain a transition metal or a transition metal compound resulted from the catalyst at their tip portions in may cases. Such transition metal or such transition compound can be removed by dissolving it with an acid or the like.

The method of the present invention is preferred to a purification step (c) after the heat-treating step (b).

In the case where as the transition metal element-containing catalyst, for instance, a magnetic transition metal selected from the group consisting of Fe, Ni, and Co or a magnetic transition metal compound selected from the group consisting of magnetic transition compounds of these magnetic transition metals is used, the resulting nanocarbon materials-containing product contains nanocarbon materials containing a magnetic body. The product is heat-treated in the heat-treating step (b) in the manner as previously described. The purification step (c) comprises subjecting the heat-treated product to a purification treatment of collecting only the magnetic body-containing nanocarbon materials by means of a magnet such as a permanent magnet or an electromagnet to obtain a purified nanocarbon materials-containing product. To be more specific, said heat-treated product is dispersed in a dispersion medium such as alcohol or water while irradiating ultrasonic wave, and thereafter, the magnetic body-containing nanocarbon materials are collected by means of a permanent magnet or an electromagnet, whereby it is possible to obtain a purified nanocarbon materials-containing product. In this case, the nanocarbon materials contained in the product contain the magnetic body. Therefore, if necessary, it is possible to subject the product to a further purification treatment in that the product is treated with an acid (such as nitric acid, hydrochloric acid, sulfuric acid, or hydrofluoric acid) or an alkali (such as sodium hydroxide or potassium hydroxide) to dissolve and remove the magnetic body contained in the nanocarbon materials contained in the product and the product thus treated is washed and dried. By this, it is possible to obtain a purified nanocarbon materials-containing product wherein said nanocarbon materials are free of the magnetic body.

Separately, the purification step (C) may be performed in the following manner. In the case where the nanocarbon materials contained in the product having been heat-treated in the heat-treating step (b) contain a transition metal or a transition metal compound resulted from the catalyst, the product is treated with an acid (such as nitric acid, hydrochloric acid, sulfuric acid, or hydrofluoric acid) or an alkali (such as sodium hydroxide or potassium hydroxide) to dissolve and remove the transition metal or the transition metal compound contained in the nanocarbon materials contained in the product and the product thus treated is washed and dried. By this, it is possible to obtain a purified nanocarbon materials-containing product wherein said nanocarbon materials contain neither the transition metal nor the transition metal compound.

However, there is an occasion in that it is preferred for the nanocarbon materials obtained to contain such residue resulted from the catalyst in their microunits or in their tip portions, depending on the application use. In this case, the purification by means of said acid or said alkali is not necessary to be performed. However, in the case where the nanocabon materials are adopted in the application use where said residue contained in the nanocarbon materials is liable to provide adverse effects, it is preferred that said purification is performed.

Separately, in both the purification by means of the magnet and the purification by means of the acid or the alkali, in order to improve the efficiency of the purification, it is possible to pulverize the nonocarbon materials-containing product by means of a mill, prior to the purification treatment.

Figure 7:
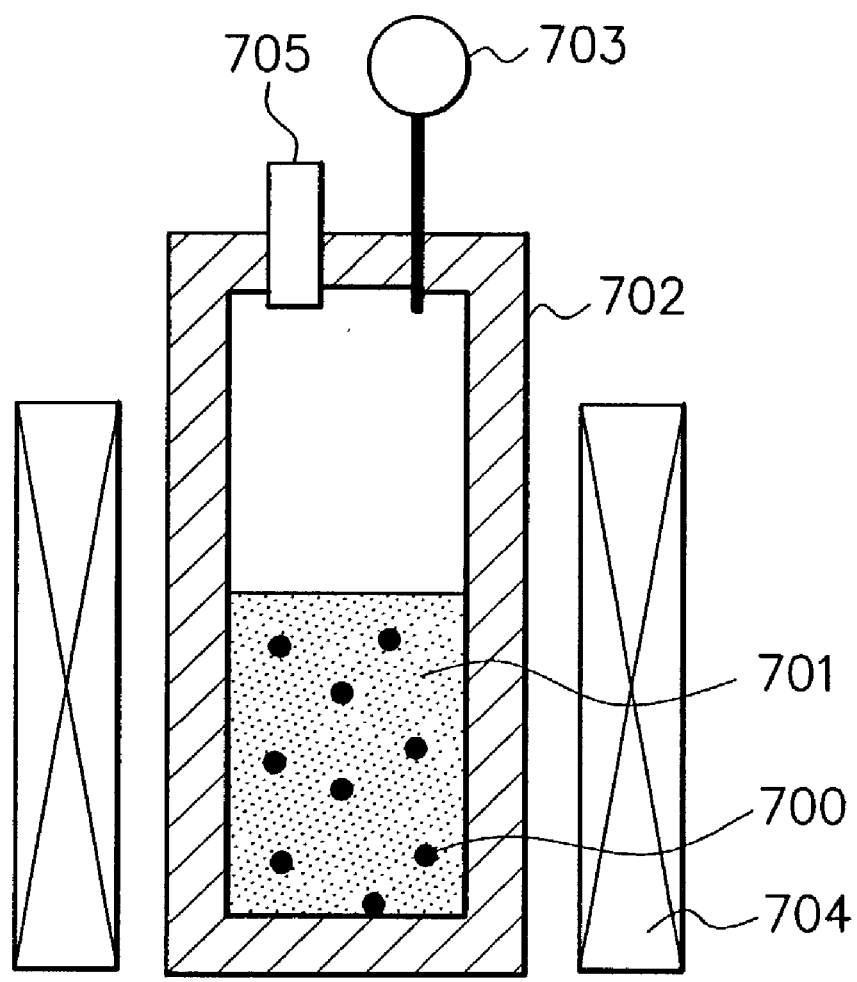
FIG. 7 is a schematic cross-sectional view illustrating an example of a reaction apparatus used for practicing the method of the present invention.

FIG. 1 shows a flow chart illustrating an example of the above-described method of the present invention. FIG. 7 is a schematic cross-sectional view illustrating an example of a reaction apparatus used for practicing the method of the present invention.

Description will be made with reference to FIG. 1.

In Step 1, a given aromatic compound-containing starting material, a given transition metal element-containing catalyst, and if necessary, a given reaction promotion medium (comprising a solvent for said starting material and a solvent for said catalyst) for promoting the reaction of said starting material and given inert gas are introduced into a substantially enclosed reaction vessel of a reaction apparatus.

In Step 2, the materials introduced in the reaction vessel are together heated at a temperature in a range of from 350° C. to 800° C. while being compressed at a pressure in a range of from 3 MPa to 50 MPa, where the starting material and/or the reaction promotion medium is converted into a supercritical fluid or a subcritical fluid and the starting material is contacted with the supercritical fluid or the subcritical fluid in the presence of the catalyst to obtain a nanocarbon materials-containing reaction product.

In Step 3, the reaction product obtained in Step 2 is subjected to a heat treatment at a temperature of 400° C. to 2800° C. preferably in an inert gas atmosphere mainly in order to remove impurities contained in the reaction product.

In Step 4, the heat-treated reaction product obtained in Step 3 is subjected to a purification treatment by means of a magnet or by means of an acid or an alkali.

However, depending on the application use of the nanocarbon materials-containing product, it is not always necessary to perform Step 4 or Steps 3 and 4.

The reaction apparatus shown in FIG. 7 comprises a substantially enclosed pressure reaction vessel 702 provided with a pressure gauge 703, a heater 704, and a safety vent 705. At least the inner wall of the reaction vessel 702 is made of preferably a stainless steel or more preferably a Ni—Mo alloy so as to have sufficient corrosion resistance.

Reference numeral 701 indicates a material comprising the foregoing reaction promotion medium and the foregoing transition metal element-containing catalyst which is contained in the reaction vessel 702, and reference numeral 700 indicates the foregoing aromatic compound-containing starting material mixed in the material 701 in the reaction vessel 702.

Although not shown in FIG. 7, it is preferred that the reaction apparatus is provided with an agitation mechanism in order to uniformly promote the reaction in the reaction vessel. Further, although not shown in FIG. 7, the reaction apparatus is preferred to have a circulating flow reaction system in that from the reaction product containing nanocarbon materials and unreacted starting material which is outputted from the reaction vessel, a nanocarbon materials-containing reaction product is isolated and the unreacted starting material is returned into the reaction vessel, in order to improve the yield from the starting material.

By the way, the form of a nanocarbon material synthesized in the present invention can be identified by way of observation by means of a scanning electron microscope (SEM), and the microstructure of said nanocarbon material can be identified by way of observation by means of a transmission electron microscope (TEM).

The proportion of an amorphous component contained in the nanocarbon material may be analyzed by means of X-ray diffraction analysis or laser Raman spectroscopy. In the case where a nanocarbon material synthesized in the present invention contains a carbon nanotube, in the Raman spectrum of said carbon nanotube, there are observed a Raman line at a position in the vicinity of 1528 to 1606 cm$^{-1}$, a Raman line at a position in the vicinity of 1353 cm$^{-1}$, and a Raman line at a position in the vicinity of 2700 cm$^{-1}$.

In the case where a nonocarbon material synthesized in the present invention is identified whether or not the graphene sheet in the microstructure is developed such that it is rolled up into a single-layered cylindrical structure or a multi-layered cylindrical structure, when a sharp X-ray diffraction peak is observed in the X-ray diffraction pattern, it means that the graphene sheet is developed as above described and thus the purity of the nanocarbon material is high, and when a broad X-ray diffraction peak is observed in the X-ray diffraction pattern, it means that the graphene sheet is not developed and the nanocarbon material contains an amorphous carbon component. Further when the nanocarbon material contains an amorphous carbon component in a large amount, a strong peak is observed at a position in the vicinity of 1353 cm$^{-1}$ in the Raman spectrum.

Thus, the purity of the nanocarbon material can be evaluated by way of identification of the form thereof by means of SEM. It can be also evaluated by TEM observation, or the half band width of the X-ray diffraction peak. Besides, it can be evaluated based on the ratio of a peak intensity in the vicinity of 1353 cm$^{-1}$ to a peak intensity in the vicinity of 1528 to 1606 cm$^{-1}$ in the Raman spectrum.

Separately, evaluation with respect to the performance of a nanocarbon materials-containing product obtained in the present invention when it is used as an anode material for a rechargeable lithium battery may be performed, for instance, in the following manner. A cell is prepared by arranging a working electrode comprising said nanocarbon materials-containing product and a counter electrode comprising a lithium metal in an electrolyte solution comprising a lithium salt as an electrolyte dissolved in a nonaqueous solvent such that said working electrode and said counter electrode are opposed to each other. Then, lithium is electrochemically inserted in the working electrode and the lithium is electrochemically released from the working electrode, where the electricity quantity consumed upon the insertion of the lithium is compared with the electricity consumed upon the release of the lithium. When both the former electricity quantity and the latter electricity quantity are large and a difference between the former electricity quantity and the latter electricity quantity is small so as to be close to zero, it means that the performance of the nanocarbon materials-containing product as the anode material for a rechargeable lithium battery is excellent.

Evaluation with respect to the performance of a nanocarbon materials-containing product obtained in the present invention when it is used as a cathode for a field emission display (FED) may be performed, for instance, in the following manner. A prescribed electric field is applied between a cathode comprising said nanocarbon materials-containing product and an anode as the counter electrode to said cathode under reduced pressure, where the value of an electric current flown per a unit area of the cathode is measured.

When the electric current value is large, it means that the nanocarbon materials-containing product is excellent in terms of the performance as the negative electrode for the FED.

Evaluation with respect to the hydrogen storage ability of a nanocarbon materials-containing product obtained in the present invention to store hydrogen therein may be performed, for instance, in the following manner. Said nanocarbon materials-containing product is maintained in a hydrogen gas under low temperature condition to permeate hydrogen gas in the nanocarbon materials-containing product and thereafter, the nanocarbon materials-containing product is heated to release hydrogen from the product, where the amount of the permeated hydrogen and the amount of the released hydrogen are measured. Based on the measured results, the stored hydrogen amount per a unit weight of the product is computed. When said amount is large, it means that the nanocarbon materials-containing product is good enough in the hydrogen storage ability.

In order to evaluate the performance of a nanocarbon materials-containing product obtained in the present invention when it is used in a catalyst-retaining layer of Pt or the like in a fuel cell, the specific surface area and the electron conductivity of the nanocarbon materials-containing product are important factors. Therefore, said specific surface area and said electron conductivity are measured. Besides, the average particle size of catalyst particles of Pt or the like which are retained in the nanocarbon materials-containing product and the power output characteristics of a fuel cell in which a catalyst-retaining layer comprising the nanocarbon materials-containing product having catalyst particles of Pt or the like retained therein is used are evaluated. In this case, it is better that the specific surface area is high, the resistivity is small, and the average particle size of the catalyst particles which are retained is small. When the resistivity is small, the electron conductivity is increased and the electrode resistance is decreased, and a result, the power outputted is increased.

By the way, a nanocarbon materials-containing product obtained in the present invention (this nanocarbon materials-containing product will be hereinafter referred to as "nanocarbon product") is low in terms of the resistivity and high in terms of the specific surface area. In general, a catalyst layer on the surface of an electrode of a fuel cell is formed of a carbon black having (a) catalyst particles of Pt or the like (whose particle sizes are relatively large) retained thereon. The nanocarbon product has a specific surface area which is larger than that of the carbon black. Thus, it is possible for the nanocarbon product to readily retain said catalyst particles on the surface thereof, and the nanocarbon product allows even (b) catalyst particles of Pt or the like whose particle sizes are minimized to be retained on the surface thereof. In this case, the specific surface area per a unit weight of the catalyst particles (b) is quite large. In the comparison with the carbon black having the catalyst particles (a) of a given weight with the nanocarbon product having said catalyst particles (b) of the same weight as the catalyst particle (a), the latter is superior to the former in terms of the performance as the catalyst. Thus, in the case where it is intended that the catalyst layer is formed of the nanocarbon product having the catalyst particles (b) retained thereon so that the catalyst thereof is substantially the same as that of the catalyst layer formed of the carbon black having the catalyst particles (a) retained thereon, the purpose can be achieved by using the catalyst particles (b) in a smaller amount (in terms of weight) than that of the catalyst particles (a). Thus, by using the nanocarbon product obtained in the present invention, the cost of the fuel cell can be diminished. In addition, the resistivity of the nanocarbon product is smaller than that of the carbon black and the nanocarbon product has a high electron conductivity. Therefore, the use of the nanocarbon product instead of the carbon black enables to improve the power generation efficiency of the fuel cell.

Separately, a nanocarbon materials-containing product obtained in the present invention can be desirably used, for instance, as a negative electrode material of a rechargeable lithium battery, as a cathode material of a FED, and as a hydrogen storage material of a hydrogen storage system.

In the following, description will be made of the usage of a nanocarbon materials-containing product (hereinafter simply referred to as "nanocarbon material") obtained in the present invention in such applications.

Rechargeable Lithium Battery:

In the case where the nanocarbon material is used in a rechargeable lithium battery (here, this includes a rechargeable lithium ion battery), it is preferred to be used as the anode material.

Figure 2:
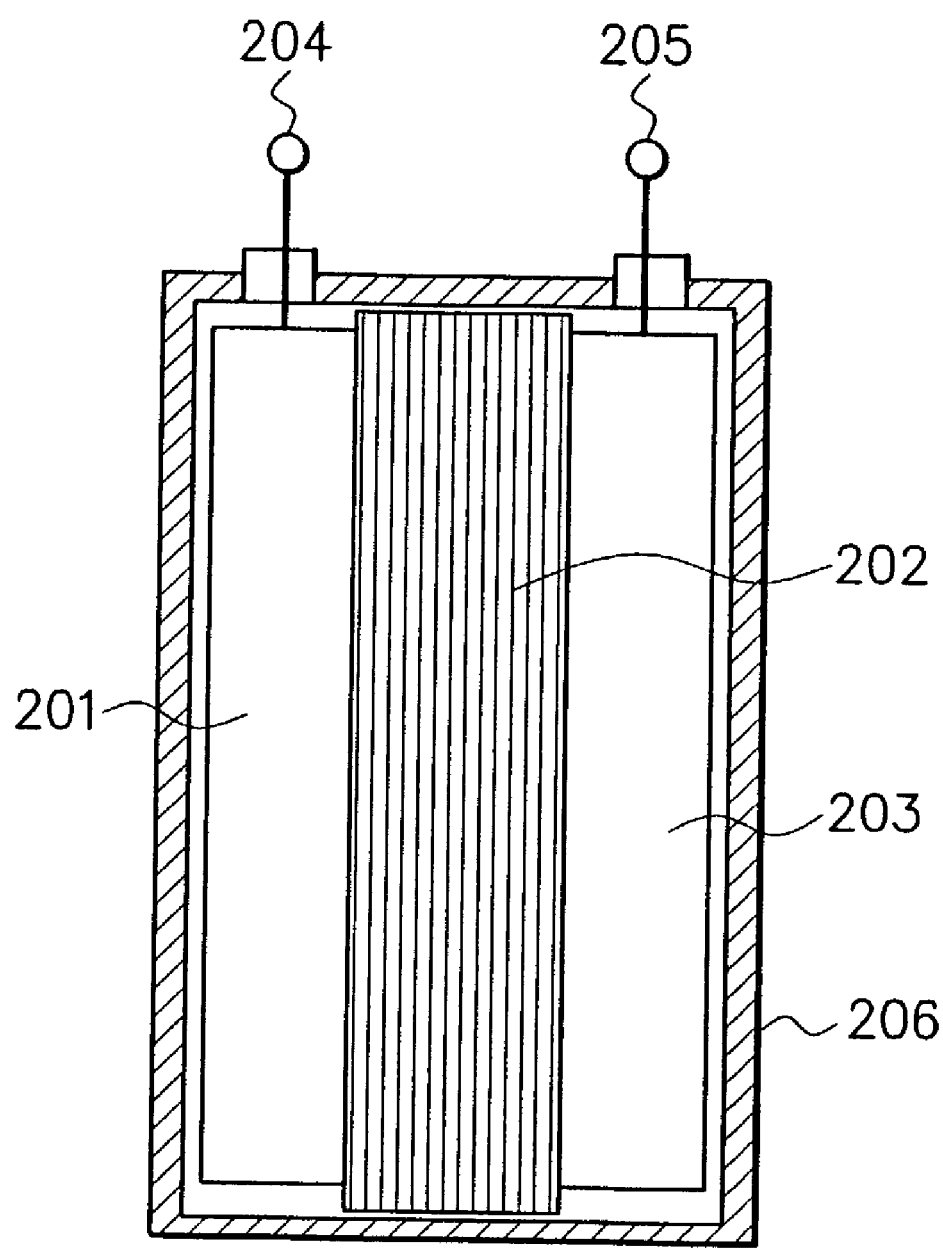
FIG. 2 is a schematic cross-sectional view illustrating an example of a rechargeable lithium battery in which a nanocarbon materials-containing product obtained according to the method of the present invention is applied.

FIG. 2 is a schematic cross-sectional view illustrating the constitution of an example of a rechargeable lithium battery. In FIG. 2, reference numeral 201 indicates an anode, reference numeral 202 an ion conductor, reference numeral 203 a cathode, reference numeral 204 an anode terminal, reference numeral 205 a cathode terminal, and reference numeral 206 a battery housing.

The anode 201 in the rechargeable lithium battery shown in FIG. 2 comprises an electrode structural body 305 shown in FIG. 3.

In FIG. 3, reference numeral 300 indicate a collector, reference numeral 301 a nanocarbon material in a powdery form (obtained in the present invention), reference numeral 302 a binder, reference numeral 303 an electrically conductive auxiliary, and reference numeral 304 an active material layer.

The electrode structural body 305 shown in FIG. 3 may be prepared, for instance, in the following manner.

A binder 302 comprising an organic polymer is admixed with aforesaid powdery nanocarbon material 301, and if necessary, an electrically conductive auxiliary 303 and a solvent are added, to obtain a mixture. The mixture is disposed on a collector 300 comprising a copper foil or the like to form an active material layer 304 on the collector 300, whereby an electrode structural body 305 is obtained.

The resultant electrode structural body 305 is used as the anode 201 in the rechargeable lithium battery shown in FIG. 2.

As aforesaid organic polymer used as the binder 302, it is possible to use a fluororesin such as polyvinylidene fluoride or the like or a water-soluble organic polymer such as polyvinyl alcohol or the like.

As the cathode 203 in the rechargeable lithium battery shown in FIG. 2, it is possible to use an electrode structural body prepared, for instance, in the following manner. A powder of a lithium-transition metal oxide, a lithium-transition metal phosphate, or a lithium-transition metal sulfate, an electrically conductive auxiliary comprising a graphite powder or the like, a binder comprising an organic polymer, and a solvent are mixed to obtain a mixture. The mixture is disposed on a collector comprising an aluminum foil or the like to form a cathode active material layer on the collector, whereby an electrode structural body is obtained. The resultant electrode structural body is used as the cathode 203.

The transition metal element of the lithium-transition metal oxide, the lithium-transition metal phosphate or lithium-transition metal sulfate which is used as the cathode active material may be Co, Ni, Mn, or Fe.

As the organic polymer used as the binder, it is possible to use a fluororesin such as polyvinylidene fluoride or the like or a water-soluble organic polymer such as polyvinyl alcohol or the like.

As the ion conductor 202 arranged between the anode 201 and the cathode 203 in the rechargeable lithium battery shown in FIG. 2, it is possible to use a separator comprising a microporous polyolefin series film formed of polyethylene or polypropylene having an electrolyte retained therein.

The electrolyte may be an electrolyte solution obtained by dissolving a lithium salt selected from lithium salts of $Li^+$ (lithium ion) with Lewis acid ions such as $BF_4^-$, $PF_6^-$, $AsF_6^-$, $ClO_4^-$, $CF_3SO_3^-$, $N(CF_3SO_2)_2^-$, or $BPh_4^-$ (with Ph being a phenyl group) in an organic solvent such as ethylene carbonate, propylene carbonate, dimethyl carbonate, or diethyl carbonate, or a gelated electrolyte obtain by gelating said electrolyte solution by adding an organic polymer thereto.

FED (Field Emission Display):

FIG. 4 is a schematic cross-sectional view illustrating the constitution of an example of a FED.

In FIG. 4, reference numeral 400 indicates an insulating plate (a glass plate), reference numeral 401 a back electrode (a negative electrode), reference numeral 402 a cathode layer formed using a nanocarbon material in a powdery form (obtained in the present invention), reference numeral 403 an insulating spacer (a barrier wall), reference numeral 404 a fluorescent substance layer, reference numeral 405 a transparent electrode (an anode), reference numeral 406 a surface mask, reference numeral 407 a transparent surface member, and reference numeral 408 an inside space.

The FED shown in FIG. 4 may be prepared, for instance, in the following manner. A metal electrode pattern 401 is arranged on a glass plate 400. On the metal electrode pattern 401, a paste obtained by mixing aforesaid powdery nanocarbon material with a binder to obtain a mixture and adding a solvent to said mixture is coated by means of screen-printing or the like, followed by drying and baking to form a layer as the cathode layer 402. A transparent electrode pattern 405 is formed on a glass plate 407 and on the transparent electrode pattern 405, there is formed a fluorescent substance layer 404 by means of screen-printing or the like. The transparent electrode 405 (the anode) and the cathode layer 402 are opposed to each other, and a spacer 403 (a barrier wall) is arranged between the transparent electrode 405 and the cathode layer 402. After the inside space 408 of the system is evacuated to a prescribed vacuum, the system is closed. In this way, the FED shown in FIG. 4 may be prepared.

The I–V characteristics with respect to electron emission from a nanocarbon material obtained in the present invention may be evaluated, for instance, in the following manner.

FIG. 5 is a schematic cross-sectional view illustrating the constitution of an example of an element used for evaluating the electron emission performance of said nanocarbon material. In FIG. 5, reference numeral 500 indicates an insulating substrate, reference numeral 501 an electrode pattern, reference numeral 502 a cathode formed using said nanocarbon material, reference numeral 503 an insulating spacer, reference numeral 504 an anode, reference numeral 505 a cathode terminal, and reference numeral 506 an anode terminal.

The element shown in FIG. 5 is placed in a vacuum chamber provided with a current introduction terminal, where the I–V characteristics with respect to electron emission from the nanocarbon material may be evaluated by applying a prescribed voltage between the anode 504 and the cathode 502 (comprising the nanocarbon material) and measuring the value of an electric current flown between the cathode 502 and the anode 504.

The element shown in FIG. 5 may be prepared, for instance, in the following manner. A mask having a cathode pattern with an electrode-drawing portion formed by way of etching is close-contacted onto a sodium-free glass substrate 500 (comprising, for instance, a No. 7059 glass plate produced by Corning Company), and thereafter, a 50 nm thick Cr film, a 300 nm thick Al film and a 50 nm thick Cr film are sequentially deposited by means of electron beam evaporation or the like to form an electrode pattern 501. Then, the foregoing powdery nanocarbon material is dispersed in isopropyl alcohol while irradiating ultrasonic wave, and said electrode pattern and a counter electrode are immersed in the dispersion, where a D.C. electric field is applied between the electrode pattern and the counter electrode to deposit said nanocarbon material on the electrode pattern 501 to form a cathode layer as the cathode 502. Successively, an insulating member comprising a mica and having a thickness of about 20 $\mu$m as the insulating spacer 503 is fixed on the cathode 502, and thereon, an aluminum plate as the anode 504 is fixed. Thereafter, a cathode terminal 505 is connected to the electrode pattern 501, and an anode terminal 506 is connected to the aluminum plate as the anode 504. In this way, the element shown in FIG. 5 may be prepared.

The evaluation of the I–V characteristics with respect to electron emission of the nanocarbon material by using the element shown in FIG. 5 may be performed in the following manner. The element is placed in a vacuum chamber provided with a current introduction terminal and which is preferably maintained at a vacuum of less than $10^{-3}$ Pa, where a prescribed voltage is applied between the anode 504 and the cathode 502 (comprising the nanocarbon material) and the value of an electric current flown between the cathode 502 and the anode 504 is measured, wherein based on the interrelation between the values of the flown electric current and the values of the voltage applied, the I–V characteristics of the nanocarbon material are evaluated.

Figure 6:
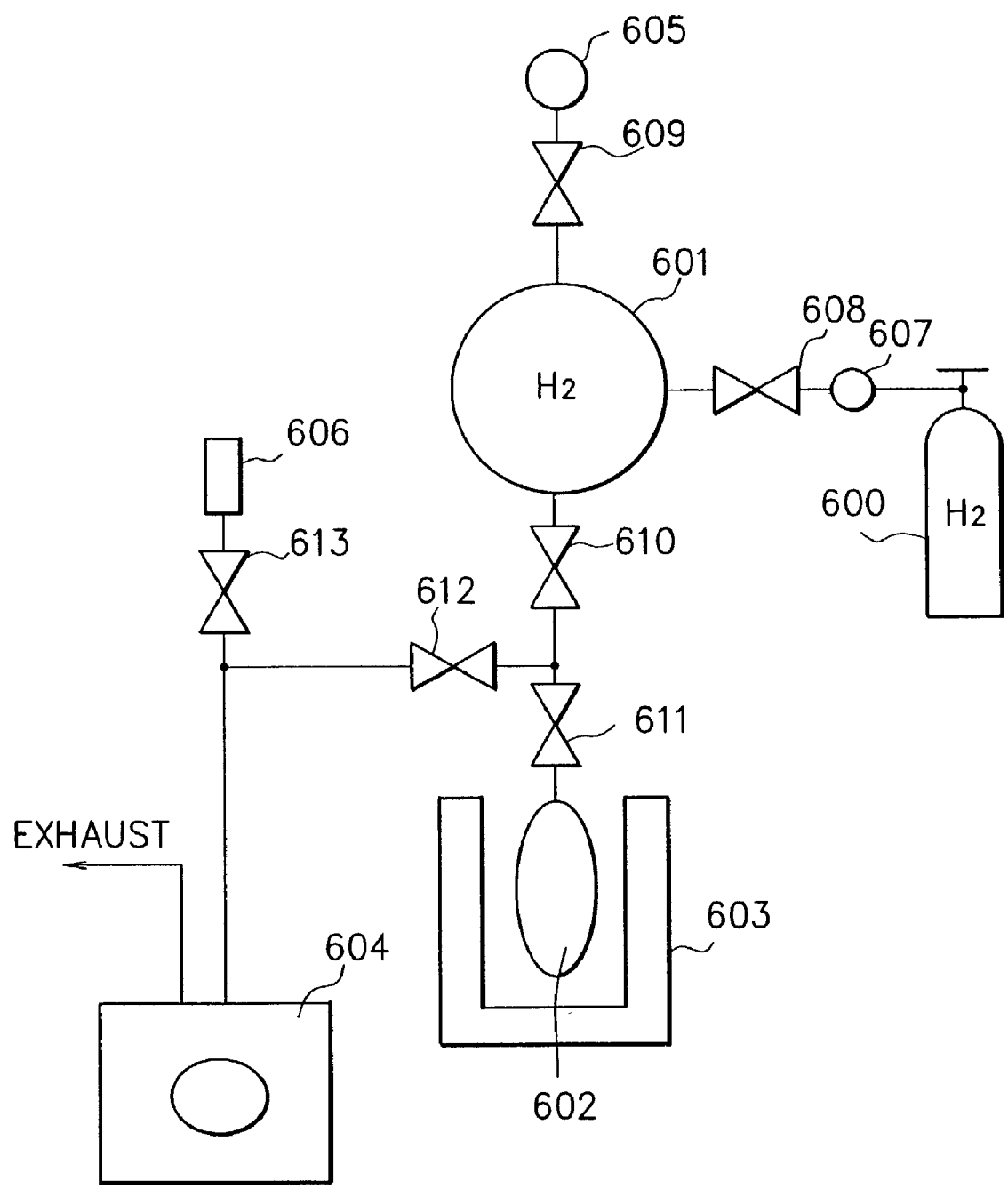
FIG. 6 is a schematic diagram illustrating an example of an apparatus for examining the hydrogen-storing performance of a nanocarbon materials-containing product.

Hydrogen Storage Material:

The hydrogen-storing performance of a nanocarbon material produced in the present invention may be evaluated by using a measuring apparatus shown in FIG. 6 having a container with a prescribed volume in which said nanocarbon material is charged and a vessel in which hydrogen is stored, wherein said container and said vessel are connected through a switching valve. In FIG. 6, reference numeral 600 indicates a high pressure hydrogen gas cylinder, reference numeral 601 a vessel in which hydrogen is stored, reference numeral 602 a container in which the nanocarbon material is charged, reference numeral 603 a temperature controller, reference numeral 604 a vacuum pump, reference numeral 605 a pressure gage, reference numeral 606 a vacuum gage, reference numeral 607 a pressure regulation valve, and each of reference numerals 608, 609, 610, 611, 612, and 613 a switching valve.

The vacuum gage 601 is connected to the container 602 through the switching valves 611, 612 and 613. The vacuum pump 604 is connected to the container 602 through the switching valves 611 and 612. The pressure gage 605 is connected to the vessel 601 through the switching valve 609.

The hydrogen gas cylinder 600 is connected to the vessel 601 through the switching valve 608 and the pressure regulating valve 607.

The evaluation of the hydrogen-storing performance of the nanocarbon material by using the measuring apparatus shown in FIG. 6 may be performed, for instance, in the following manner. A sufficiently dried powdery nanocarbon material is provided. The weight of the powdery nanocarbon material is measured, and the powdery nanocarbon material is inserted in the container 602.

The inside of the container 602 is evacuated to a high vacuum, and hydrogen gas from the vessel 601 whose inside pressure is maintained at a prescribed pressure is introduced into the container 602 by opening the switching valves 610 and 611, and after a prescribed period of time is elapsed, the hydrogen gas pressure in the container 602 and that in the vessel 601 are measured. From the initial hydrogen gas pressure in the vessel 601, the volume of the vessel 601 and that of the container 602, it is possible to compute the amount of hydrogen stored in the powdery nanocarbon material per a unit weight of the powdery nanocarbon material. However, in practice, while changing the pressure of the hydrogen gas introduced into the container 602, the stored hydrogen amount and the released hydrogen amount respectively when the hydrogen gas pressure in the container 602 is equilibrated are measured, and based on the measured results, the hydrogen stored amount per a unit weight of the powdery nanocarbon material is computed.

In the following, the present invention will be described in more detail with reference to examples. It should be understood that these examples are only for illustrative purposes and the scope of the present invention is not restricted by these examples.

EXAMPLE 1

Into the reaction vessel [made of a Hastelloy (comprising a Ni—Mo alloy) (trademark name, produced by Haynes International Inc.)] with an inner volume of 96 ml of the reaction apparatus shown in FIG. 7, 2.5 g of toluene (the critical temperature: 319° C.; the critical pressure: 4.11 MPa) as the starting material and 0.2 g of a nickelocene (bis(cyclopentadienyl)nickel) as the transition metal element-containing catalyst were introduced and they were mixed, followed by adding 30 g of dryice (as the raw material for forming the supercritical fluid or the subcritical fluid) thereto, and the reaction vessel was closed. The materials introduced in the reaction vessel were subjected to a reaction treatment at a temperature of 450° C. under pressure condition of 12.0 MPa for 6 hours to obtain 0.4 g of a powdery nanocarbon materials-containing product (this will be hereinafter referred to as "nanocarbon product (a)"). The yield of the nanocarbon product (a) produced in this case was calculated.

In the above, the dryice introduced in the reaction vessel is vaporized into $CO_2$ gas. Therefore, the adjustment of the reaction pressure to a prescribed value (12.0 MPa) was conducted by exhausting part of the $CO_2$ gas outside the reaction vessel. Particularly, a temperature-pressure curve with respect to the relationship between the gaseous pressure in the reaction vessel before heated and an increase in the gaseous pressure along an increase in the inside temperature of the reaction vessel has been established in advance. In accordance with the temperature-pressure curve, by exhausting part of the $CO_2$ gas outside the reaction vessel before heated, the adjustment of the reaction pressure was conducted. In this case, because the pressure adjustment is conducted under temperature condition of the temperature of the dryice, the vapor pressure of an aromatic compound such as toluene or the like as the starting material is extremely low and therefore, the amount of the gas vaporized from the starting material which is exhausted outside the reaction vessel is very small to such an extent that can be disregarded.

In the above, instead of the dryice (for generating $CO_2$ gas) introduced into the reaction vessel, it is possible that $CO_2$ gas from a high pressure $CO_2$ gas cylinder is introduced into the reaction vessel.

A part of the resultant nanocarbon product (a) was subjected to a heat treatment at a temperature of 1500° C. for 2 hours to obtain a powdery nanocarbon materials-containing product (this will be hereinafter referred to as "heat-treated nanocarbon product (b)").

Each of a sample of the nanocarbon product (a) and a sample of the heat-treated nanocarbon product (b) was subjected to observation by means of a SEM (scanning electron microscope) and a TEM (transmission electron microscope). In addition, each of them was subjected to measurement with respect to specific surface area by means of the BET (Brunauer-Emmet-Teller) method. Further each of them was subjected to evaluation with respect to crystalinity by means of X-ray diffraction analysis.

In the SEM observation, there were obtained the following findings.

Figure 8:
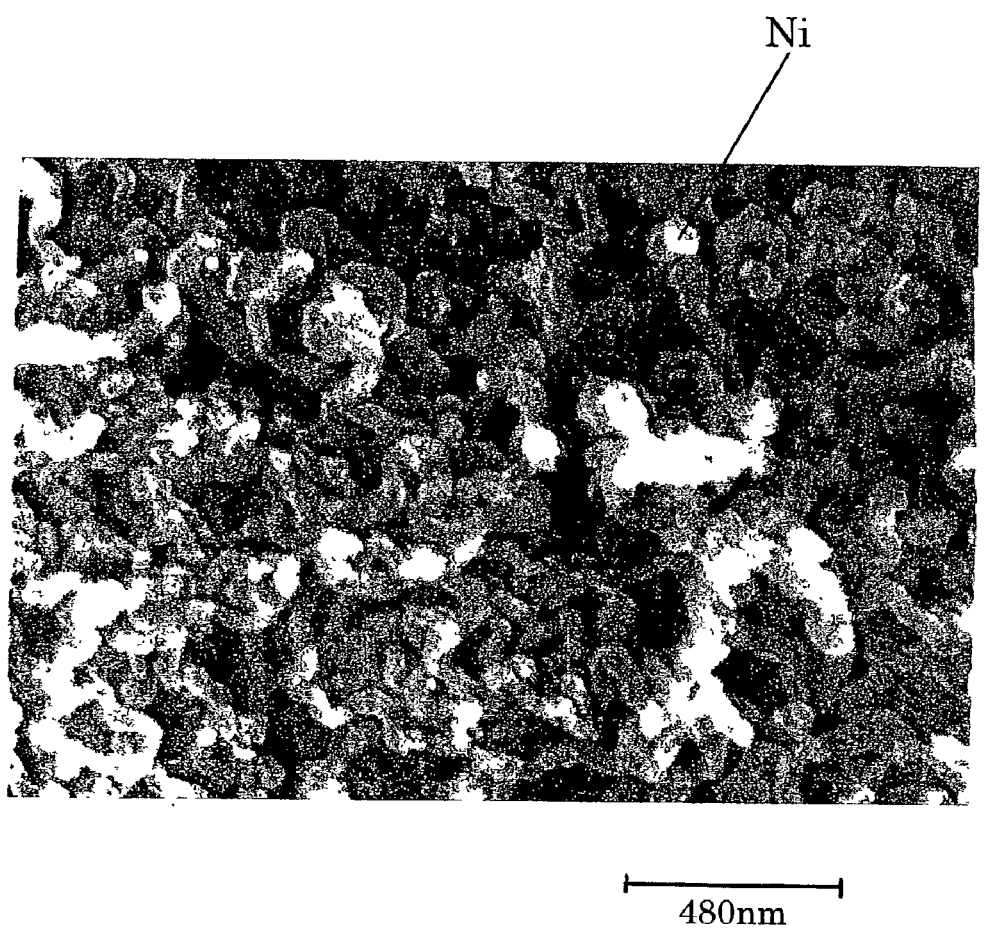
FIG. 8 shows a SEM (scanning electron microscope) image of an example of a nanocarbon material produced by the method of the present invention.

Each of the nanocarbon product (a) and the heat-treated nanocarbon product (b) comprises an enormous number of worm-like shaped microunits which are substantially uniform as shown in a SEM image of FIG. 8. The worm-like shaped microunits of the nanocarbon product (a) are substantially the same as those of the heat-treated nanocarbon product (b). The worm-like shaped microunits of each of the nanocarbon product (a) and the heat-treated nanocarbon product (b) have an average diameter of 20 to 30 nm and an average length of 200 to 500 nm and they contain nickel metal microparticles at their tips. FIG. 11(*a*) is a schematic view showing one of said worm-like shaped microunits which contains a nickel metal microparticle at the tip thereof. This was found out from the results obtained in the XMA (X-ray microanalysis), the TEM observation and the X-ray diffraction analysis. Further in the SEM observation, there was obtained a finding that each of the nanocarbon product (a) and the heat-treated nanocarbon product (b) does not contain other microunits than the worm-like shaped microunits. From this, it is presumed that each of the nanocarbon product (a) and the heat-treated nanocarbon product (b) has a purity of nearly 100%.

Figure 9:
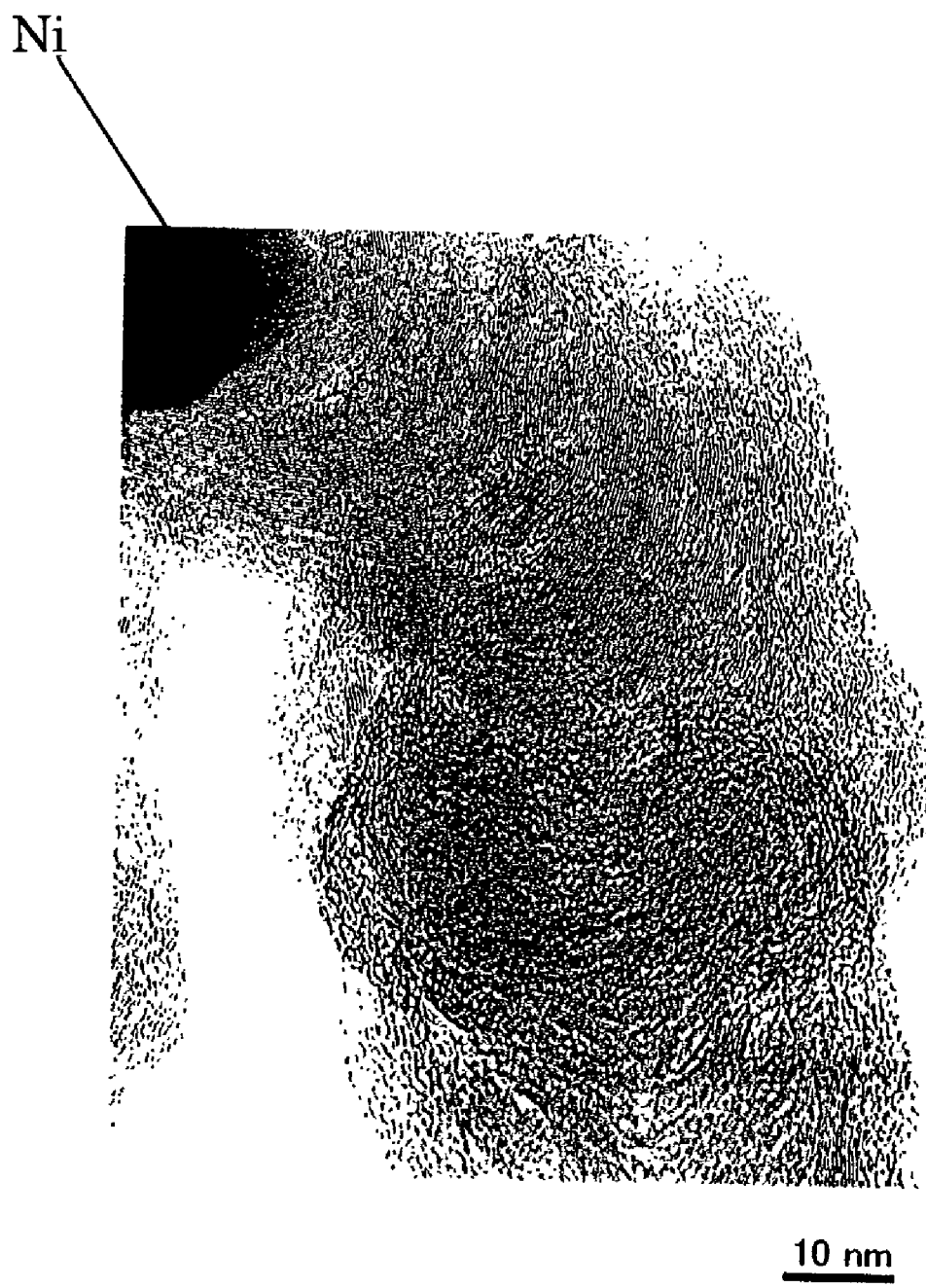
FIG. 9 shows a TEM (transmission electron microscope) image of an example of a nanocarbon material produced by the method of the present invention.

The TEM observation revealed that each of the worm-like shaped microunits of each of the nanocarbon product (a) and the heat-treated nanocarbon product (b) would have a microstructure in that a number of cup-like shaped components are stacked as shown in FIG. 11(*b*) into a worm-like form. Further, in comparison of the nanocarbon product (a) with the heat-treated nanocarbon product (b) with respect to their lattice images, it was found that the latter is more clearer than the former. For the reason for this, it is considered such that in the heat-treated nanocarbon product (b), a graphene sheet structure would be developed due to the heat treatment. FIG. 9 shows a TEM image of the heat-treated nanocarbon product (b) in which a black region corresponds to a nickel metal microparticle.

From the X-ray diffraction patterns of the nanocarbon product (a) and the heat-treated nanocarbon product (b) which were obtained by the X-ray diffraction analysis, it was found that the spacing calculated from the main peak is 34 nm in each case.

From the measured results of the nanocarbon product (a) and the heat-treated nanocarbon product (b) with respect to their specific surface areas by the BET method, it was found that the former has a specific surface area of 260 $m^2/g$ and the latter has a specific surface area of 140 $m^2/g$.

Separately, the heat-treated nanocarbon product (b) was treated with hydrochloric acid then treated with nitric acid to elute and remove the nickel contained therein. The heat-treated nanocarbon product (b) thus treated was washed with ion-exchanged water and heat-treated at a temperature of 350° C. in an air atmosphere, whereby a powdery Ni-free nanocarbon product [hereinafter referred to as "nanocarbon product (b')] was obtained.

The nanocarbon product (b') was subjected to evaluation with respect to the electron emission performance. Particularly, an element having the structure shown in FIG. 5 was prepared in the previously described manner for the preparation of the element shown in FIG. 5 wherein using the nanocarbon product (b'), a nanocarbon material layer as the cathode 502 was formed on the electrode pattern 501 by way of electro-deposition.

The element thus prepared was placed in a vacuum chamber provided with a current introduction terminal and which is maintained at a vacuum of less than $10^{-3}$ Pa, where a prescribed electric field was impressed to the element to measure I–V characteristics with respect to electron emission. As a result, the nanocarbon product (b') [corresponding to the heat-treated nanocarbon product (b)] was found to have an electron emission performance which is greater by about 10 times that of a commercially available carbon multinanotube material (produced by The Honjo Chemical Corporation).

Besides, the nanocarbon product (a) was subjected to evaluation with respect the hydrogen-storing ability thereof in accordance with the previously described evaluation manner using the measuring apparatus shown in FIG. 6. As a result, the nanocarbon product (a) was found to have a hydrogen-storing ability which is substantially the same as that of a commercially available carbon multinanotube.

EXAMPLES 2, 3 AND 4

The procedures of Example 1 for the preparation of the nanocarbon product (a) were repeated three times, except that the reaction pressure in each case was changed to 8.4 MPa, 6.0 MPa, or 4.6 MPa in the same manner as in Example 1, to obtain a powdery nanocarbon product (i) [Example 2], a powdery nanocarbon product (ii) [Example 3] and a powdery nanocarbon product (iii) [Example 4]. The adjustment of the reaction pressure in each case was conducted in the same manner as in Example 1.

The yield of each of the nanocarbon product (i), the nanocarbon product (ii) and the nanocarbon product (iii) produced in Examples 2 to 4 was calculated.

Then, each of the nanocarbon product (i), the nanocarbon product (ii) and the nanocarbon product (iii) was subjected to observation by the SEM. As a result, each of the nanocarbon product (i), the nanocarbon product (ii) and the nanocarbon product (iii) was found to comprise an enormous number of worm-like shaped microunits which are substantially uniform, as well as the nanocarbon product (a) produced in Example 1.

EXAMPLE 5

The procedures of Example 1 for the preparation of the nanocarbon product (a) were repeated, except that the reaction pressure was changed to 3.3 MPa, to obtain a powdery nanocarbon product. The adjustment of the reaction pressure in this case was conducted in the same manner as in Example 1.

The yield of the nanocarbon product produced in this comparative example was calculated. The yield of the nanocarbon product in this example was found to be lower than that of the nanocarbon product (a) in Example 1.

Then, the nanocarbon product was subjected to observation by the SEM. As a result, the nanocarbon product was found to comprise an enormous number of worm-like shaped microunits which are substantially uniform, as well as the nanocarbon product (a) produced in Example 1.

COMPARATIVE EXAMPLE 1

The procedures of Example 1 for the preparation of the nanocarbon product (a) were repeated, except for changing the reaction pressure to 0.7 MPa, wherein no nanocarbon material was synthesized. The adjustment of the reaction pressure in this case was conducted in the same manner as in Example 1.

EXAMPLE 6

The procedures of Example 1 for the preparation of the nanocarbon product (a) were repeated, except that the reaction temperature was changed to 350° C. and the reaction pressure was changed to 9.4 MPa, to obtain a powdery nanocarbon product. The adjustment of the reaction pressure in this case was conducted in the same manner as in Example 1.

The yield of the nanocarbon product produced in this example was calculated. The yield of the nanocarbon product produced in this example was found to be inferior to that of the nanocarbon product (a) in Example 1.

Then, the nanocarbon product produced in this example was subjected to observation by the SEM. As a result, the nanocarbon product was found to comprise an enormous number of worm-like shaped microunits which are substantially uniform, as well as the nanocarbon product (a) produced in Example 1.

COMPARATIVE EXAMPLE 2

The procedures of Example 1 for the preparation of the nanocarbon product (a) were repeated, except for changing the reaction temperature was changed to 300° C. and changing the reaction pressure to 7.9 MPa, wherein no nanocarbon material was synthesized. The adjustment of the reaction pressure in this case was conducted in the same manner as in Example 1.

EXAMPLE 7

The procedures of Example 1 for the preparation of the nanocarbon product (a) were repeated, except that 0.25 g of ethanol as the solvent for the starting material and the catalyst was additionally added and the reaction pressure was changed to 12.9 MPa, to obtain a nanocarbon product. The adjustment of the reaction pressure in this case was conducted in the same manner as in Example 1.

The yield of the nanocarbon product produced in this example was calculated. The yield of the nanocarbon product in this example was compared with the yield of the nanocarbon product (a) in Example 1. As a result, the former was found to be greater than the latter.

Then, the nanocarbon product produced in this example was subjected to observation by the SEM. As a result, the nanocarbon product was found to comprise an enormous number of worm-like shaped microunits which are substantially uniform, as well as the nanocarbon product (a) produced in Example 1.

COMPARATIVE EXAMPLE 3

The procedures of Example 1 for the preparation of the nanocarbon product (a) were repeated, except that no toluene was introduced into the reaction vessel and the reaction pressure was changed to 12.4 MPa, wherein no nanocarbon material was synthesized. The adjustment of the reaction pressure in this case was conducted in the same manner as in Example 1.

EXAMPLE 8

The procedures of Example 1 for the preparation of the nanocarbon product (a) were repeated, except that the introduction of the dryice into the reaction vessel was omitted and the reaction pressure was made to be 8.6 MPa in the absence of $CO_2$, to obtain a nanocarbon product.

The yield of the nanocarbon product produced in this example was calculated. As a result, the yield of the nanocarbon product in this example was found to be smaller than the yield of the nanocarbon product (a) in Example 1.

Then, the nanocarbon product was subjected to observation by the SEM. As a result, the nanocarbon product was found to comprise an enormous number of worm-like shaped microunits which are substantially uniform, as well as the nanocarbon product (a) produced in Example 1.

Total Evaluation

The yields of the nanocarbon products in Examples 1 to 8 and Comparative Examples 1 to 3 are collectively shown in Table 1. The values with respect to the yield shown in Table 1 are respectively a normalized value when the value of the yield in Example 1 is set at 1.00. In Table 1, the reaction conditions adopted in Examples 1 to 8 and Comparative Examples 1 to 3 are also collectively shown.

From the results of Examples 1 to 5 and Comparative Examples 1 and 2 in Table 1, it is understood that when the reaction of the starting material [toluene (the critical temperature: 319° C.; the critical pressure: 4.11 MPa) was used as the starting material in each case] is performed at a temperature which is lower than the critical temperature of the starting material or at a pressure which is lower than the critical pressure of the starting material, although a nanocarbon product is produced, the amount of the nanocarbon product produced is quite small and the yield is inferior. Further, it is understood that under conditions with a temperature which is lower than the subcritical temperature and a pressure which is less than the subcritical pressure, substantially no nanocarbon material is synthesized.

In addition, from the results of Examples 2 and 8 and Comparative Example 3 in Table 1, it is understood that the presence of carbon dioxide brings about an increase in the yield of the nanocarbon product.

Further in addition, from the results of Examples 1 and 7 in Table 1, it is understood that the addition of ethanol as the solvent also brings about an increase in the yield of the nanocarbon product.

TABLE 1

| | toluene | CO$_2$ | ethanol | temperature [° C.] | pressure [MPa] | normalized yield |
|---|---|---|---|---|---|---|
| Example 1 | used | used | not used | 450 | 12.0 | 1.00 |
| Example 2 | used | used | not used | 450 | 8.4 | 1.00 |
| Example 3 | used | used | not used | 450 | 6.0 | 0.78 |
| Example 4 | used | used | not used | 450 | 4.6 | 0.37 |
| Example 5 | used | used | not used | 450 | 3.3 | 0.09 |
| Comparative Example 1 | used | used | not used | 450 | 0.7 | 0.00 |
| Example 6 | used | used | not used | 350 | 9.4 | 0.08 |
| Comparative Example 2 | used | used | not used | 300 | 7.9 | 0.00 |
| Example 7 | used | used | used | 450 | 12.9 | 1.68 |
| Comparative Example 3 | not used | used | not used | 450 | 12.4 | 0.00 |
| Example 8 | used | not used | not used | 450 | 8.6 | 0.18 |

EXAMPLES 9 AND 10

EXAMPLE 9

The procedures of Example 1 for the preparation of the nanocarbon product (a) were repeated, except that instead of the toluene, benzene was introduced into the reaction vessel, to obtain a nanocarbon product (Ex. 9).

EXAMPLE 10

The procedures of Example 1 for the preparation of the nanocarbon product (a) were repeated, except that instead of the toluene, xylene was introduced into the reaction vessel, to obtain a nanocarbon product (Ex. 10).

Each of the nanocarbon product (Ex. 9) and the nanocarbon product (Ex. 10) was subjected to observation by the SEM. As a result, each of them was found to comprise an enormous number of worm-like shaped microunits which are substantially uniform, as well as the nanocarbon product (a) produced in Example 1.

In Example 10 in which xylene including isomers thereof, i.e., m-xylene, o-xylene, and p-xylene was used, the yield of the nanocarbon product (Ex. 10) was somewhat different depending on the kind of the isomer used. However the yield of the nanocarbon product in any case was inferior to the yield of the nanocarbon product (a) in Example 1.

EXAMPLES 11, 12 AND 13

EXAMPLE 11

The procedures of Example 1 for the preparation of the nanocarbon product (a) were repeated, except that instead of the nichelocene as the catalyst, a nickel formate was introduced into the reaction vessel, to obtain a nanocarbon product (Ex. 11).

EXAMPLE 12

The procedures of Example 1 for the preparation of the nanocarbon product (a) were repeated, except that instead of the nichelocene as the catalyst, an alumina powder whose micropores having very fine particles of a nickel metal retained therein was introduced into the reaction vessel, to obtain a nanocarbon product (Ex. 12).

EXAMPLE 13

The procedures of Example 1 for the preparation of the nanocarbon product (a) were repeated, except that instead of the nichelocene as the catalyst, a nickel metal powder whose particles having a particle size in a region of from 0.02 to 0.6 μm was introduced into the reaction vessel, to obtain a nanocarbon product (Ex. 13).

Each of the nanocarbon product (Ex. 11), the nanocarbon product (Ex. 12) and the nanocarbon product (Ex. 13) was subjected to observation by the SEM. As a result, each of them was found to comprise an enormous number of worm-like shaped microunits which are substantially uniform, as well as the nanocarbon product (a) produced in Example 1.

However, the worm-like shaped microunits of the nanocarbon product (Ex. 12) were found to have an average diameter which is smaller in comparison that of those of the nanocarbon product (Ex. 11) or the nanocarbon product (Ex. 13). The reason for this is considered to be due to a factor that the nickel metal particles as the catalyst are fine.

On the other hand, the maximum diameter of the worm-like shaped microunits of the nanocarbon product (Ex. 13) was found to be about 500 nm which is larger in comparison with that of those of the nanocarbon product (Ex. 11) or the nanocarbon product (Ex. 12) and the maximum length of the worm-like shaped microunits of the nanocarbon product (Ex. 13) was found to be longer than about 5 μm. In the observed results by the SEM, in the case where the nickel metal powder had a relatively large average particle size, there were observed several instances in that nanocarbons having a worm-like form were grown from the opposite sides of a nickel particle. Further, the TEM image revealed that the nanocarbon product (Ex. 12) would have several portions in that a number of graphene sheets are stacked as shown in FIG. 11(c) and grown into a pillar form.

EXAMPLE 14

Figure 12A:
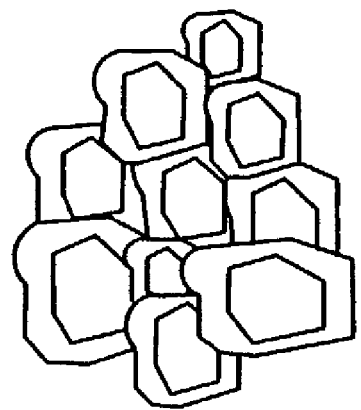
FIG. 12(a) is a schematically enlarged view illustrating another example of the microstructural form of a nanocarbon material produced by the method of the present invention, observed from the SEM image thereof.

The procedures of Example 1 for the preparation of the nanocarbon product (a) were repeated, except that instead of the nichelocene as the catalyst, a ferrocene was introduced into the reaction vessel, to obtain a nanocarbon product. The nanocarbon product was subjected to observation by the SEM. As a result, being different from Example 1, there was observed a microstructural form in that an enormous number of particle-like shaped nanocarbons are gathered as shown in FIG. 12(a) and grown into a rod form.

EXAMPLE 15

The procedures of Example 1 for the preparation of the nanocarbon product (a) were repeated, except that instead of the carbon dioxide of the dryice, high pressure argon gas was introduced into the reaction vessel, to obtain a nanocarbon product. The nanocarbon product was subjected to observation by the SEM. As a result, the nanocarbon product was found to comprise an enormous number of worm-like shaped microunits which are substantially uniform, as well as the nanocarbon product (a) produced in Example 1. The yield of the nanocarbon product produced in this example was somewhat lower than that in Example 1 but higher than that in Example 8.

EXAMPLE 16

The procedures of Example 1 for the preparation of the nanocarbon product (a) were repeated, except that a pitch instead of the toluene, ion-exchanged water instead of the dryice, and a nickel nitrite instead of the nichelocene were introduced into the reaction vessel and the materials introduced in the reaction vessel were subjected to reaction at a temperature of 400° C. under pressure condition of 35.0 MPa, to obtain a nanocarbon product.

Figure 12B:
FIG. 12(b) is a schematically enlarged view illustrating a further example of the microstructural form of a nanocarbon material produced by the method of the present invention, observed from the SEM image thereof.

The nanocarbon product was subjected to observation by the SEM. As a result, there were observed a number of nanocarbons comprising a plurality of coral-like shaped microunits having such a form as shown in FIG. 12(b).

EXAMPLE 17

Into the reaction vessel (made of a stainless steel) with an inner volume of 200 ml of the reaction apparatus shown in FIG. 7, 24.0 g of a pitch (the softening point: 108° C.), 2.4 g of a nickel sulfide powder, 1.0 g of a nickel oxide powder and 2.4 g of a tungsten carbide powder were introduced and they were mixed, followed by adding 55.0 g of dryice thereto, and the reaction vessel was closed. The materials introduced in the reaction vessel were subjected to a first reaction treatment at a temperature of 50° C. under pressure condition of 7.8 MPa for 12 hours, followed by subjecting to a second reaction treatment a temperature of 350° C. under pressure condition of 8.8 MPa for 10 hours, whereby a nanocarbon materials-containing product (this will be hereinafter referred to as "nanocarbon product") was obtained.

The resultant nanocarbon product was subjected to a first heat treatment in an argon gas atmosphere at a temperature of 400° C. for 10 hours, followed by subjecting to a second heat treatment in an argon gas atmosphere at a temperature of 900° C. for 2 hours, whereby a heat-treated nanocarbon product was obtained. The heat-treated nanocarbon product was ground by means of a planetary ball mill, followed by subjecting to a heat treatment in an argon atmosphere at a temperature of 2300° C. for 2 hours, whereby a carbon powder was obtained.

Figure 13A:
FIG. 13(a) is a schematically enlarged view illustrating a further example of the microstructural form of a nanocarbon material produced by the method of the present invention, observed from the TEM image thereof.
Figure 13B:
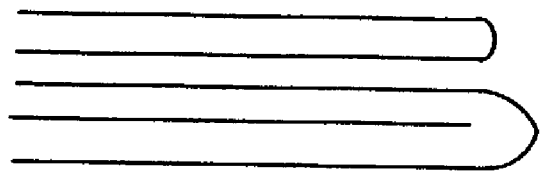
FIG. 13(b) is a schematically enlarged view illustrating a still further example of the microstructural form of a nanocarbon material produced by the method of the present invention, observed from the TEM image thereof.

A sample of the resultant carbon powder was observed by the TEM. As a result, there were identified a portion comprising aggregates of a plurality of multitube structures comprising a plurality of tubular components stacked as shown in FIG. 13(a) and a portion comprising a plurality of graphite structures whose end portions are closed as shown in FIG. 13(b).

Figure 10:
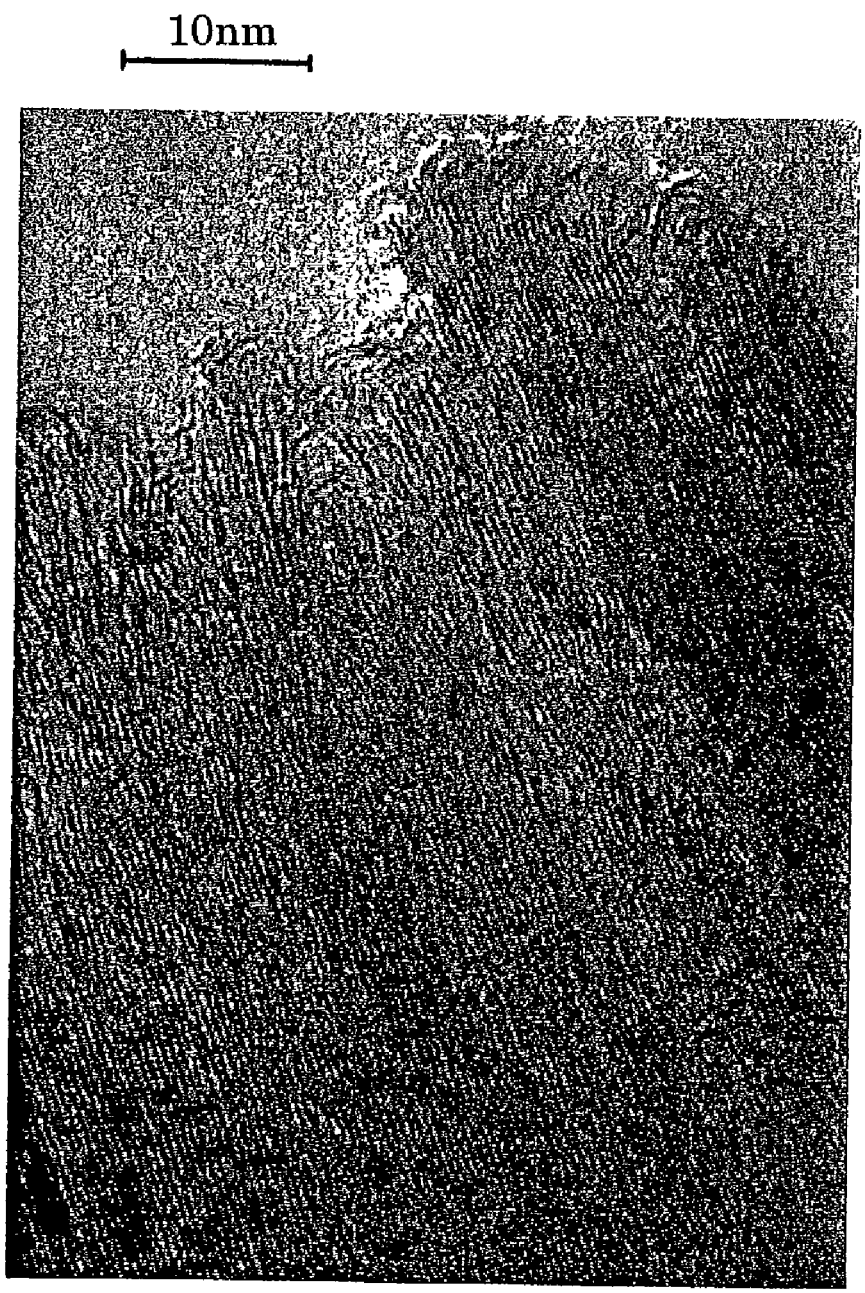
FIG. 10 shows a TEM image of another example of a nanocarbon material produced by the method of the present invention.

In FIG. 10, there is shown a TEM image of a sample of the carbon powder.

From the observation of the TEM image shown in FIG. 10, it was found that the tubular components in the multitube structure have a diameter in a range of from 3 to 6 nm and the aggregate in which the multitube structures are aggregated has a diameter of more than 50 nm and a length of more than about 200 nm.

Separately, there was prepared a rechargeable lithium battery having such structure as shown in FIG. 2 in accordance with the preparation manner previously described with reference to FIG. 2 and using the above carbon powder as the anode material. The rechargeable lithium battery prepared was found to have an anode capacity which is greater by 1.2 times that of a conventional rechargeable lithium battery having an anode comprising a graphite.

As above described, according to the present invention, it is possible to effectively produce nanocarbon materials from a relatively inexpensive starting material by a simple manner using a relatively inexpensive reaction apparatus without necessity of using a costly vacuum reaction apparatus. In addition, the method for producing nanocarbon materials in the present invention can be practiced in a large-scaled reaction apparatus so as to mass-produce nanocarbon materials.

What is claimed is:

1. A method for producing nanocarbon materials which do not include fullerenes, characterized in that said method includes a step (a) of contacting an aromatic compound-containing starting material with a supercritical fluid or a subcritical fluid in the presence of a transition metal element-containing catalyst at a temperature in a range of from 350 to 800° C. and at a pressure in a range of from 3 to 50 MPa.

2. The method according to claim 1, wherein said supercritical fluid or said subcritical fluid is formed from one or more kinds of materials selected from the group consisting of an aromatic compound as said starting material, a solvent for said aromatic compound, a solvent for said catalyst, water, dinitrogen monoxide, and ammonia.

3. The method according to claim 2, wherein said solvent for said aromatic compound or said catalyst comprises one or more kinds of materials selected from the group consisting of carbon dioxide, alcohols, water and ethers.

4. The method according to claim 1, wherein at least one kind of inert gas selected from the group consisting of argon gas, helium gas, and nitrogen gas is added into the reaction system of said step (a).

5. The method according claim 1, wherein said aromatic compound-containing starting material comprises at least one kind of material selected from the group consisting of benzene, ethylbenzene, butylbenzene, toluene, xylene, styrene, biphenyl, phenylacetylene, phenol, ethylphenol, fluoranthene, pyrene, chrysene, phenanthrene, anthracene, naphthalene, methylnaphthalene, fluorene, acenaphthene, pitch, pitch coke, petroleum coke, and coal tar.

6. The method according to claim 1, wherein the transition metal element-containing catalyst comprises at least one kind of a transition metal selected from the group consisting of transition metals or/and at least one kind of a transition metal compound selected from the group consisting of transition metal compounds.

7. The method according to claim 6, wherein said at least one kind of a transition metal is at least one kind of a transition element selected from the group consisting of Ni, Co, Fe, Cu, Cr, W, Mo, Ti, Ru, Rh, Pd, and Ag.

8. The method according to claim 6, wherein said at least one kind of a transition metal compound is at least one kind of a transition compound selected from the group of consisting of transition metal compounds comprising at least one kind of a transition metal element selected from the group consisting of Ni, Co, Fe, Cu, Cr, W, Mo, Ti, Ru, Rh, Pd, and Ag.

9. The method according to claim 6, wherein said at least one kind of a transition metal compound is at least one kind of a transition metal compound selected from the group consisting of transition metal sulfides, transition metal carbides, organo transition metal compounds, transition metal nitrides, transition metal oxides, and transition metal salts.

10. The method according to claim 1, wherein the transition metal element-containing catalyst comprises at least one kind of a transition metal compound selected from the group consisting of transition metal sulfides, transition metal carbides, organo transition metal compounds, transition metal nitrides, transition metal oxides, and transition metal salts, respectively comprising at least one kind of a transition metal element selected from the group consisting of Ni, Co, Fe, Cu, Cr, W, Mo, Ti, Ru, Rh, Pd, and Ag.

11. The method according to claim 1, wherein the transition metal element-containing catalyst comprises at least one kind of a transition metal sulfide selected from the group consisting of nickel sulfide, iron sulfide, cobalt sulfide, copper sulfide, titanium sulfide, tungsten sulfide, and molybdenum sulfide or at least one kind of a transition metal carbide selected from the group consisting of tungsten carbide, molybdenum carbide, and titanium carbide.

12. The method according to claim 1, wherein the transition metal element-containing catalyst comprises at least one kind of an organo transition metal compound selected from the group consisting of ferrocene, nickelocene, nickel formate, nickel oxalate, nickel naphthenate, nickel phthalocyanine, cobalt phthalocyanine, copper phthalocyanine, nickel acetylacetonato, cobalt acetylacetonato, iron acetylacetonato, copper acetylacetonato, nickel carbonyl, cobalt carbonyl, iron carbonyl, bis(triphenylphosphine)dicarbonylnickel, dibromobis(triphenylphosphine)nickel, and chlorotris(triphenylphosphine)rhodium.

13. The method according to claim 1, wherein a surface-active agent is made to coexist together with said transition metal element-containing catalyst.

14. The method according to claim 1, wherein said further includes a step (b) of subjecting a reaction product obtained in said step (a) to a heat treatment at a temperature in a range of from 400 to 2800° C.

15. The method according to claim 14, wherein said heat-treating step (b) is conducted at a temperature in a range of from 600 to 2200° C.

16. The method according to claim 14, wherein said heat-treating step (b) is repeated several times by changing the heat-treating temperature.

17. The method according to claim 16, wherein said reaction product is a first heat treatment at a temperature in a range of from 400 to 800° C. and said reaction product is subjected to a second heat treatment at a temperature in a range of from 900 to 2800° C.

18. The method according to claim 14, wherein said heat-treating step (b) is conducted in a gas atmosphere composed of one or more gases selected from the group consisting of argon gas, helium gas and nitrogen gas.

19. The method according to claim 1, wherein each of said nanocarbon materials produced comprises a plurality of microunits at least having a shape selected from the group consisting of a worm shape, a filament shape, a rod shape comprising spherical microparticles aggregated into a unit, a coral shape, and a tube shape.

20. The method according to claim 19, wherein said plurality of microunits have an average diameter in a range of from 2 to 400 nm.

21. The method according to claim 1, wherein each of said nanocarbon materials produced comprises an aggregate comprising a plurality of tube-like shaped nanocarbons having an average diameter in a range of from 0.4 to 400 nm which are aggregated, observed from a TEM image thereof.

22. The method according to claim 19, wherein said plurality of microunits have an average length in a range of from 100 to 10000 nm.

23. The method according to claim 1, wherein each of said nanocarbon materials produced has a transition metal element therein or at a tip portion thereof.

24. The method according to claim 1, wherein each of said nanocarbon materials produced has a transition metal, a transition metal oxide, a transition metal carbide or a transition metal sulfide therein or at tip portion thereof.

25. The method according to claim 1, wherein said method includes a purification step of purifying a reaction product obtained in said step (a) by virtue of a magnetic force by means of a permanent magnet or an electromagnet.

* * * * *

UNITED STATES PATENT AND TRADEMARK OFFICE
CERTIFICATE OF CORRECTION

PATENT NO. : 7,001,581 B2
APPLICATION NO. : 10/263754
DATED : February 21, 2006
INVENTOR(S) : Soichiro Kawakami et al.

It is certified that error appears in the above-identified patent and that said Letters Patent is hereby corrected as shown below:

ON COVER PAGE AT (56) OTHER PUBLICATIONS

"Hydrogeneration" should read --Hydrogenation--.

COLUMN 1

Line 20, "carrying" should read --carried--; and
Line 31, "researches have been conducting" should read --research has been conducted--.

COLUMN 2

Line 49, "any" should read --any one--; and
Line 65, "require to use" should read --require the use of--.

COLUMN 3

Line 14, "nonocarbon" should read --nanocarbon--.

COLUMN 5

Line 11, "nonocarbon" should read --nanocarbon--;
Line 19, "include" should read --includes--; and
Line 34, "heated-treated" should read --heat-treated--.

COLUMN 7

Line 45, "stating" should read --starting--.

COLUMN 8

Line 34, "can" should read --can be--;
Line 41, "can" should read --can be--; and
Line 46, "to be" should be deleted.

UNITED STATES PATENT AND TRADEMARK OFFICE
CERTIFICATE OF CORRECTION

| | | |
|---|---|---|
| PATENT NO. | : 7,001,581 B2 | |
| APPLICATION NO. | : 10/263754 | |
| DATED | : February 21, 2006 | |
| INVENTOR(S) | : Soichiro Kawakami et al. | |

It is certified that error appears in the above-identified patent and that said Letters Patent is hereby corrected as shown below:

COLUMN 9

Line 12, "reasons" should read --reason--;
    Line 17, "being occurred." should read --occurring.--;
    Line 37, "being occurred." should read --occurring.--; and
    Line 65, "stating" should read --starting--.

COLUMN 12

Line 34, "micro units" should read --microunits--; and
    Line 41, "present," should read --present invention,--.

COLUMN 14

Line 7, "nonocarbon" should read --nanocarbon--.

COLUMN 15

Line 14, "nonocarbon" should read --nanocarbon--.

COLUMN 16

Line 37, "and" should read --and as.--.

COLUMN 17

Line 33, "indicate" should read --indicates--.

COLUMN 18

Line 20, "obtain" should read --obtained--.

COLUMN 19

Line 19, "irradiating" should read --while being irradiated with an--.

UNITED STATES PATENT AND TRADEMARK OFFICE
CERTIFICATE OF CORRECTION

PATENT NO. : 7,001,581 B2
APPLICATION NO. : 10/263754
DATED : February 21. 2006
INVENTOR(S) : Soichiro Kawakami et al.

It is certified that error appears in the above-identified patent and that said Letters Patent is hereby corrected as shown below:

COLUMN 20

Line 15, "is" should read --has--;
    Line 61, "before" should read --before being--; and
    Line 65, "before" should read --before being--.

COLUMN 21

Line 6, "that" should read --that it--.

COLUMN 22

Line 34, "respect" should read --respect to--.

COLUMN 26

Line 17, "that" should read --than that--.

COLUMN 27

Line 60, "that" should read --than that--.

COLUMN 28

Line 47, "of" (2nd occurrence) should be deleted.

COLUMN 29

Line 23, "wherein said" should be deleted;
    Line 24, "includes" should read --including--; and
    Line 35, "800°C." should read --800°C.,--.

UNITED STATES PATENT AND TRADEMARK OFFICE
CERTIFICATE OF CORRECTION

| | | |
|---|---|---|
| PATENT NO. | : 7,001,581 B2 | |
| APPLICATION NO. | : 10/263754 | |
| DATED | : February 21, 2006 | |
| INVENTOR(S) | : Soichiro Kawakami et al. | |

It is certified that error appears in the above-identified patent and that said Letters Patent is hereby corrected as shown below:

COLUMN 30

Line 30, "tip" should read --a tip--.

Signed and Sealed this

Seventeenth Day of October, 2006

JON W. DUDAS
*Director of the United States Patent and Trademark Office*